United States Patent
Nakahara et al.

(10) Patent No.: US 8,570,919 B2
(45) Date of Patent: Oct. 29, 2013

(54) HALF-DUPLEX COMMUNICATION SYSTEM, HALF-DUPLEX COMMUNICATION DEVICE, COMMUNICATION CONTENT CONFIRMATION METHOD, AND ITS PROGRAM

(75) Inventors: Fumitaka Nakahara, Tokyo (JP); Shin Harada, Tokyo (JP); Kazuhiro Takahashi, Tokyo (JP)

(73) Assignee: Nec Corporation, Tokyo (JP)

( * ) Notice: Subject to any disclaimer, the term of this patent is extended or adjusted under 35 U.S.C. 154(b) by 504 days.

(21) Appl. No.: 12/600,185

(22) PCT Filed: May 9, 2008

(86) PCT No.: PCT/JP2008/058662
§ 371 (c)(1),
(2), (4) Date: Nov. 13, 2009

(87) PCT Pub. No.: WO2008/140055
PCT Pub. Date: Nov. 20, 2008

(65) Prior Publication Data
US 2010/0208630 A1 Aug. 19, 2010

(30) Foreign Application Priority Data

May 14, 2007 (JP) ................................. 2007-128533

(51) Int. Cl.
*H04L 5/16* (2006.01)
(52) U.S. Cl.
USPC ........... 370/296; 370/261; 370/276; 455/517; 455/518; 455/519; 709/204; 707/802
(58) Field of Classification Search
None
See application file for complete search history.

(56) References Cited

U.S. PATENT DOCUMENTS

2007/0160192 A1* 7/2007 Horio et al. ................... 379/338

FOREIGN PATENT DOCUMENTS

| JP | 2005-234666 A | 9/2005 |
|----|---------------|--------|
| JP | 2005-278109 A | 10/2005 |
| JP | 2006-191555 A | 7/2006 |
| JP | 2006-279715 A | 10/2006 |
| JP | 2007-60303 A  | 3/2007 |

OTHER PUBLICATIONS

International Search Report for PCT/JP2008/058662 mailed Jul. 8, 2008.
Comneon, Ericsson, Motorola, Siemens and Nokia, "Push-to-talk over Cellular (PoC); Architecture; PoC Release 2.0", Architecture V2.0.8., (Jun. 2004).

* cited by examiner

Primary Examiner — Kibrom T Hailu

(57) ABSTRACT

A half-duplex communication system that allows a user terminal to confirm past communication contents even during a series of half-duplex communications is provided. The system includes a communication record database in which all communication contents of half-duplex communications are stored together with identifiers thereof. A half-duplex communication device for controlling half-duplex communications includes a communication record control device which receives a communication content, transmits the communication content together with the identifier thereof to the communication record database so as to store it therein, and reads out the communication record therein. In response to a communication record readout request, the half-duplex communication device reads out a communication record in place of transmitting the communication content to a user terminal.

14 Claims, 13 Drawing Sheets

HALF-DUPLEX COMMUNICATION SYSTEM, HALF-DUPLEX COMMUNICATION DEVICE, COMMUNICATION CONTENT CONFIRMATION METHOD, AND ITS PROGRAM

This application is the National Phase of PCT/JP2008/058662 filed on May 9, 2008, which is based upon and claims the benefit of priority from Japanese patent application No. 2007-128533, filed on May 14, 2007, the disclosure of which is incorporated herein in its entirety by reference.

TECHNICAL FIELD

The present invention relates to a half-duplex communication system, a communication content confirmation method, and its program. In particular, the present invention relates to a half-duplex communication system, a half-duplex communication device, a communication system, and its program, capable of confirming past communication records during communications.

BACKGROUND ART

Half-duplex communication is a technique used for PoC (Push-to-Talk over Cellular) using transceivers and mobile telephones as transceivers, which enables one-to-N communications. In recent years, PoC has been gradually in services by, among others, Sprint Nextel Corporation in the United States. While there are some methods to realize PoC, the basic schemes thereof are the same, including a PoC server having a session management function and a floor control function, and GLMS (Group and List Management Server) for managing a group list. In the present invention, the terms shown in Non-Patent Document 1 are used. Note that a user terminal configuring a part of the present invention shown below corresponds to a component called UE in Non-Patent Document 1.

As the PoC is a service for performing communications in real time, when group communications are to be performed, a user who cannot participate in PoC communications at that time because of being outside the communication area cannot participate in the communications. Further, as there is no means of recording communication contents, a user who was not able to participate in a session configuring a series of communications or in parts of the session has no way to acquire and confirm communication contents by, or a user who participated in the group communications has no way to confirm the communication contents later by.

In order to solve this problem, a technique having a means for recording communication contents in a PoC communication system has been reported (see Patent Document 1). Further, a technique having a means for storing communication contents such as voice messages transmitted from a transmission side when a terminal of a receiving side cannot perform communications has been reported (see Patent Document 2). Furthermore, a technique having a means for recording dialogue contents and if there is a member not participating in the session among the pre-registered members, notifying him/her of the fact that the dialogues are recorded (see Patent Document 3).

Non-Patent Document 1: Issued by Comneon, Ericsson, Motorola, Siemens, and Nokia, PoC Architecture; PoC Release 2.0
Patent Document 1: Japanese Unexamined Patent Publication 2005-234666
Patent Document 2: Japanese Unexamined Patent Publication 2006-191555
Patent Document 3: Japanese Unexamined Patent Publication 2005-278109

DISCLOSURE OF THE INVENTION

Problems to be Solved by the Invention

However, in the communication recording and confirming methods as shown in Patent Documents 1 to 3, although it is possible to confirm communication contents when a communication terminal is separated from a transmission terminal and is not able to receive communications from the transmission terminal, when attempting to confirm records of the communication contents so far during the session when the communication terminal is able to receive the communications from the transmission terminal, there is a problem that the user may miss real-time communication contents or it is impossible for the user to confirm the missed communication contents.

An object of the present invention is to provide a half-duplex communication system, a half-duplex communication device, a communication content confirmation method, and its program, in which one of user terminals belonging to a communication group can confirm past communication contents while maintaining the current communication contents, even when a series of half-duplex communications are being performed among the user terminals belonging to the communication group.

Means for Solving the Problems

In order to achieve the object, a half-duplex communication system according to the present invention is a half-duplex communication system for performing one-to-N communications, one user terminal being a calling terminal and another user terminal being a receiving terminal, including a communication record database in which a communication content of one-to-N communications is recorded by being associated with an identifier identifying a user terminal, a communication record unit which writes and reads the communication content to and from the communication record database while being associated with the identifier, and a session management section which outputs a communication content received from the calling terminal to the communication record unit, while associating the communication content with an identifier of the calling terminal, causes the communication record unit to read out the communication content from the communication record database in accordance with a confirmation request received from a user terminal, and transmits the communication content to the user terminal sending the confirmation request.

A half-duplex communication device according to the present invention is a half-duplex communication device which controls communications between 1 to N, one user terminal being a calling terminal and another user terminal being a receiving terminal, including a communication record database in which a communication content of one-to-N communications is recorded by being associated with an identifier identifying a user terminal, a communication record unit which writes and reads the communication content to and from the communication record database while being associated with the identifier, and a session management section which outputs a communication content received from the calling terminal to the communication record unit, while associating the communication content with an identifier of the calling terminal, causes the communication record unit to read out the communication content from the communication record database in accordance with a confirmation request received from a user terminal, and transmits the communication content to the user terminal sending the confirmation request.

A communication content confirmation program according to the present invention is a communication content confirmation program for performing one-to-N communications, one user terminal being a calling terminal and another user terminal being a receiving terminal, causing a computer to perform a function of recording a communication content of one-to-N communications in a communication record database by associating the communication content with an identifier identifying a user terminal, a function of writing and reading the communication content to and from the communication record database while associating the communication content with the identifier, and a function of reading out the communication content from the communication record database in accordance with a confirmation request received from a user terminal, and transmitting the communication content to the user terminal sending the confirmation requesting.

A half-duplex communication program according to the present invention is a half-duplex communication program for controlling one-to-N communications, one user terminal being a calling terminal and another user terminal being a receiving terminal, causing a computer to perform a function of writing and reading a communication content of one-to-N communications to or from the communication record database of the communication content by associating the communication content with an identifier identifying a user terminal, and a function of outputting a communication content received from the calling terminal while associating the communication content with an identifier of the calling terminal, causing the communication content to be read out from the communication record database in accordance with a confirmation request received from a user terminal, and transmitting the communication content to the user terminal sending the confirmation request.

A communication content confirmation method according to the present invention is a communication content confirmation method for performing one-to-N communications, one user terminal being a calling terminal and another user terminal being a receiving terminal, including, recording a communication content of one-to-N communications in a communication record database by associating the communication content with an identifier identifying a user terminal, writing and reading the communication content to and from the communication record database while associating the communication content with the identifier, and reading the communication content from the communication record database in accordance with a confirmation request received from a user terminal and transmitting the communication content to the user terminal sending the confirmation requesting.

Effects of the Invention

According to the present invention, as communication contents are recorded together with an identifier so as to be able to be read out in response to a request by a user terminal, the user terminal is able to perform confirmation and extraction of past communication records while maintaining current communication contents, even when half-duplex communications are being performed.

BEST MODES FOR CARRYING OUT THE INVENTION

Hereinafter, exemplary embodiments of the invention will be described in detail based on the drawings.

First Exemplary Embodiment

Hereinafter, a first exemplary embodiment of the invention will be described based on FIGS. 1 to 4.

First, FIG. 1 is a block diagram showing the configuration of a half-duplex communication system according to a first exemplary embodiment. In the below description, "communication contents" indicate communication contents including voices and videos, "to record" means storing communication contents in a communication record database, and "communication records" mean logs of communication contents stored in the communication record database.

The first exemplary embodiment of the invention is a half-duplex communication system including a half-duplex communication device 10 which controls and manages half-duplex communications in which communications can be performed in only one direction at one time, a plurality of user terminals 30, 31, and 32 which belong to a communication group having been registered beforehand and perform half-duplex communications via the half-duplex communication device 10, and a communication record database 20 for recording all communication contents of half-duplex communications together with media burst identifiers which are identifiers of the communication contents, via the half-duplex communication device 10. The half-duplex communication device 10 includes a floor right management section 13 which allows a floor right for giving priority to be a calling terminal to one of the user terminals 30, 31, and 32, a session management section 11 which receives a communication content transmitted from the user terminal 31 which is a calling terminal (hereinafter referred to as a calling terminal), relay-transmits the communication content to the user terminals (hereinafter referred to as receiving terminals) 30 and 32 other than the calling terminal 31, and manages communication states of the half-duplex communications, and a communication record control device (communication record control section) 12 which receives the communication content from the session management section 11, transmits the communication content to the communication record database 20 so as to store it therein, and reads out a communication record responding to a request from the session management section 11.

With this configuration, the first exemplary embodiment of the invention is capable of appointing a specific user terminal as a calling terminal so as to cause the terminal to perform half-duplex communications, recording all communication contents of the half-duplex communications, and retrieving and reading out the communication records in response to a request from a user terminal.

The user terminals 30, 31, and 32 respectively have recorded contents acquisition confirmation units 30B, 31B, and 32B, each of which causes the half-duplex communication device 10 to read out the communication records of the communication contents recorded in the communication record database 20 so as to confirm the past communication records. The session management section 11 of the half-duplex communication device includes a database drive control unit 11A which performs a process of recording the communication content transmitted from the calling terminal 31 in the communication record database 20 via the communication record control device 12, and a communication record transmission unit 11B which, when an acquisition request is made from the user terminal 30, 31, or 32 for the communication record recorded in the communication record database 20, reads out the corresponding communication record from the communication record database 20 via the communication record control section 12 and transmits the communication record to the user terminal.

Further, the user terminals 30, 31, and 32 respectively include communication record buffers 30A, 31A, and 32A for temporarily recording the communication contents, and the calling terminal 31 preferentially records the communication contents transmitted by itself, and the user terminals 30 and 32 preferentially records the received communication contents, in the communication record buffers 30A, 31A, and 32A. The user terminals 30, 31, and 32 are configured such that when confirming the communication records, the user terminals 30, 31, and 32 first confirm the contents recorded in the communication record buffers 30A, 31A, and 32A by means of temporal record confirmation functions 30C, 31C, and 32C for confirming communication records in the communication record buffers 30A, 31A, and 32A of their own, and then, for the unrecorded parts, request the session management section 11 to read out the communication records recorded in the communication record database 20.

With this configuration, the exemplary embodiment is adapted to record the communication contents also in the communication record buffers. Thereby, a half-duplex communication system in which, for a communication record of a length which can be sufficiently recorded in the communication record buffers, confirmation of the content can be performed in a short time.

Further, the session management section 11 includes a non-transmission record unit 11C which, when a state where communication contents are not transmitted to any of the user terminals 30, 31, and 32 is caused, stores the fact of non-transmission together with the identifier of the user terminal in a non-transmission record data map 40 (non-transmission record unit) provided beforehand, a non-transmitted content transmission unit 11D which, when the user terminal has completed confirmation of the communication record with respect to the fact of non-transmission recorded in the non-transmission record unit or when the communications have ended, reads out the non-transmitted communication record from the communication record database 20 and transmits it to the user terminal, and a non-transmission record erasing unit 11E which, when the communication record of non-transmission is transmitted, erases the corresponding non-transmission record from the non-transmission record unit each time. The non-transmission record data map 40 is a database for storing and holding a media burst identifier (identifier of communication content) of non-transmitted communication content by each user terminal. In this case, a control to store the user identifier for identifying a user terminal while associating it with the media burst identifier is performed.

The half-duplex communication device 10 and the non-transmission record data map 40 may be provided within a user terminal. Regarding the communication record database 20 and the communication record buffers 30A, 31A and 32A, either one may be provided. The half-duplex communication device 10, the communication record database 20, the user terminal 30, the communication record buffers 30A, 31A, and 32A, and the non-transmission record data map 40 may be operated by program control.

Further, a communication record confirmation flag 70 is provided, which is managed by a session management section 11 provided to each of the user terminals 30, 31, and 32 and showing that the user terminal thereof is performing confirmation of communication records by the record content acquisition confirmation units 30B, 31B, and 32B. When the communication record confirmation flag 70 is ON, the communication contents transmitted from the calling terminal 31 is recorded in the user terminal column of the non-transmission record data map 40.

FIG. 1 discloses, among the basic functions of the half-duplex communication device 10, a session management unit according to the exemplary embodiment as a session management section 11. In addition to a general session management function of managing a series of communications, the session management section 11 performs transmission of a record request to the communication record control device 12 and reception of the requested contents, control of the non-transmission communication data map 40, and management of the communication record confirmation flag 70. Further, the half-duplex communication device 10 may include a group member registration device (registration unit) 50 for pre-registering a communication group and user terminals belonging to the communication group.

Operation of the first exemplary embodiment of the invention will be described in accordance with the drawings. FIG. 2 is a flowchart showing the procedures of storing communication content data in the communication record database 20.
(Operation: Storing in Communication Record Database)

Storing in the communication record database 20 will be performed in the following orders.
(1) The session management section 11 reads out user terminals belonging to a communication group which performs communications this time from the group member registration device and stores the user terminals (step S101).
(2) The session management section 11 receives a communication content from a user terminal of a caller (hereinafter referred to as a "calling terminal") 31 to which a floor right is given by the floor right management section 13 (step S102).
(3) The session management section 11 transmits the received content to the communication record control device 12 in order to store the communication content in the communication record database 20 by the database drive control unit 11A, together with the receiving terminals 30 and 32 (step S103).
(4) When the communication record control device 12 receives the communication content from the session management section 11, the communication record control device 12 stores the communication content in the communication record database 20 together with an identifier of the communication content (step S104: communication content recording step). The processes from step S101 to step S104 are performed each time communications are performed.
(5) The storing procedure ends when the communications end (step S105).
(Operation: Storing of Communication Content Data)

FIG. 3 is a flowchart showing the procedures of storing communication content data to the communication record buffers 30A, 31A, and 32A of the user terminals 30, 31, and 32.

Recording in the communication record buffers 30A, 31A, and 32A are performed in the following order.
(1) The calling terminal 31 transmits a communication content and records the communication content on the communication record buffer 31A (step S201).
(2) The session management section 11 receives the communication content from the calling terminal 31 (step S202).
(3) The session management section 11 transmits the communication content to the user terminals 30 and 32 (step S203).

(4) The user terminals 30 and 32 respectively store the received communication content in the communication record buffers 30A and 32A of their own (step S204).

The processes from step S201 to step S204 are performed each time communications are performed. Note that the records on the communication record buffers 30A, 31A, and 32A are the same as the data recorded in the communication record database 20. However, in the case of storing data larger than the capacity of the respective communication record buffers 30A, 31A, and 32A, recording is performed up to the limit and recording of the communication contents exceeding the capacity will not be performed on the communication record buffers 30A, 31A, and 32A.

(5) The storing procedure ends when the communications end (step S205).

As such, the communication content recording step described above has a feature that the communication content transmitted or received by the respective user terminals (user terminal) are preferentially recorded in the communication record buffers 30A, 31A, and 32A held by themselves beforehand.

FIG. 4 is a flowchart showing processes corresponding to a communication record confirmation request from the user terminal 30 in the first exemplary embodiment. Further, FIG. 5 is a time chart showing the confirmation requesting process in the first exemplary embodiment of the invention.

(Operation: Communication Record Confirmation Request Process)

Hereinafter, a communication record confirmation requesting process in the first exemplary embodiment of the invention will be described in accordance with FIGS. 4 and 5. Note that in the time chart of FIG. 5, the numerals starting with S correspond to the steps in the flowchart of FIG. 4, and the numerals in parenthesis correspond to the heading numbers of the respective paragraphs shown below.

(1) The user terminal 30 which performs communication record confirmation transmits a communication record confirmation request to the session management section 11 based on the communication record confirmation request unit 30B (step S301: confirmation request transmission step).

(2) Upon receiving the communication record confirmation request, the session management section 11 turns a communication record confirmation flag 70 on (step S302).

(3) The user terminal 30 determines whether the communication record buffer 30A contains the designated communication record (step S303).

If there is the record, the session management section 11 reads out the designated communication record data from the communication record buffer 30A based on the temporal record confirmation function 30C, and confirms whether the communication content is completely recorded (step S304). If the designated communication record is not held within the capacity of the communication record data 30A, a communication record difference readout request for acquiring difference data from the complete communication record is made to the session management section 11 (step S306). If the communication record designated at step S303 is not in the communication record buffer 30A, a communication record confirmation request is transmitted to the session management section 11 (step S305: confirmation request transmission step). If the communication record designated at step S303 is stored in the communication record buffer 30A and it is confirmed at step S304 that the communication content is completely recorded, confirmation of the communication record is performed with the record in the communication record buffer 30A (step S307).

(4) Upon receiving the communication record confirmation request or the communication record difference readout request, the session management section 11 requests the communication record control device 12 to read out the designated communication record, and the communication record control device 12 reads out the communication record of the requested record from the communication record database 20 (step S308). This readout is performed through transmission and reception between the communication record control device 12 and the communication record database 20.

(5) The communication record control device 12 transmits the communication record read out from the communication record database 20 to the session management section 11.

(6) The session management section 11 transmits the communication record received from the communication record control device 12 to the user terminal 30 based on the communication record transmission function 11B (step S309: communication content extraction step).

(7) Upon receiving the requested communication record, the user terminal 30 confirms the communication record (step S310).

(8) On the other hand, during the time that the user terminal 30 is confirming the communication record, the user terminal 31 obtains a floor right and transmits a communication content to the session management section 11 (step S320).

(9) Upon receiving the communication content, the session management section 11 records the received content via the communication record control device 12 in the communication record database 20 together with a media burst identifier which is the identifier of the communication content, and transmits the communication content to a user terminal (user terminal 32) which is other than the calling terminal (user terminal 31) and no communication record confirmation flag 70 is on (step S321, communication content extraction step). Further, to the terminal in which the communication record confirmation flag 70 is on, the session management section 11 additionally stores the media burst identifier communicated for each terminal in the non-transmission record data map 40 based on the non-transmission record function 11C. This means that if a state where the communication content is not transmitted to any of the user terminals has been caused, the session management section 11 maps the user identifier and the media burst identifier on the non-transmission record data map (non-transmission record unit) 40 and stores the fact of non-transmission (step S322: non-transmission record step). Note that the processes of step S320 and step S321 may be repeated.

(10) After communication record confirmation at step S307 or step S310 has been completed, the user terminal 30 transmits a signal indicating that the confirmation has been completed to the session management section 11 (step S311).

(11) Upon receiving the signal, the session management section 11 inquires the non-transmission record data map 40 that whether there is any non-transmission record (step S312).

If there is a non-transmission record, the session management section 11 reads out mapping information, that is, the media burst identifier of the non-transmitted data corresponding to the user terminal 30 from the non-transmission record data map 40, and makes a communication record readout request for the record corresponding to this media burst identifier to the communication record control device 12 (step S313). If there is no non-transmission record, the communication record confirmation flag 70 is turned off and the process ends (S318).

(12) At step S313, upon receiving the communication record readout request, the communication record control device 12 reads out the requested record from the communication record database 20 with use of the media burst identifier (step S314).

(13) The communication record control device 12 transmits the communication record read out from the communication record database 20 to the session management section 11.

(14) The session management section 11 transmits the communication record received from the communication record control device 12 to the user terminal 30 which made a request for communication record confirmation. This means that after the user terminal 30 corresponding to the fact of non-transmission recorded in the non-transmission record data map (non-transmission record unit) 40 finishes confirmation of the communication record or after the communications have ended, the session management section 11 reads out, from the communication record database 20, and transmits, to the user terminal making the request for communication record confirmation, the non-transmitted communication record (step S315: non-transmitted record transmission step).

The operation of the session management section 11 from step S312 to step S315 is based on the non-transmitted content transmission function 11D. Along with it, the session management section 11 erases the mapping information corresponding to the requested data from the non-transmission record data map 40 each time, based on the non-transmission record erasure function 11E (step S316: non-transmission record erasure control step).

(15) Upon receiving the requested communication record, the user terminal 30 confirms the communication record (step S317). If there is another non-transmission record at (11) above, the processes from step S311 to step S317 are repeated each time.

(16) When there is no non-transmission record in the non-transmission record data map 40, the communication record confirmation flag 70 is turned off (step S318) and the process ends.

According to the first exemplary embodiment, even during the session being performed by the half-duplex communications, a communication record can be confirmed, and when a new communication is performed during confirmation of the communication record, the communication content of such communication can be confirmed subsequently without fail after the confirmation of the previous communication record.

Second Exemplary Embodiment

Next, a second exemplary embodiment of the invention will be described. The second exemplary embodiment is adapted to include the half-duplex communication device 10, the communication record database 20, the user terminals 30, 31, and 32, the communication record buffers 30A, 31A, and 32A, and the non-transmission record data map 40 which when communication contents are not transmitted to any one of the user terminals 30, 31, and 32, records the fact of non-transmission for each of the user terminals 30, 31, and 32, which are the same as the first exemplary embodiment.

The second exemplary embodiment is different from the first exemplary embodiment in that when the respective user terminals 30, 31, and 32 store and read out communication records, the communication record buffers 30A, 31A, and 32A of their own are used prior to the communication record database 20.

FIG. 6 is a flowchart showing a process responding to a communication record confirmation request from the user terminal 30 of the second exemplary embodiment, and FIG. 7 shows a time chart of this process in the second exemplary embodiment.

(Description of Operation: Communication Record Confirmation Requesting Process)

Hereinafter, a process when the user terminal 30 makes a communication record confirmation request will be described in accordance with FIGS. 6 and 7. Note that in the time chart of FIG. 7, the numerals starting with S correspond to the steps in the flowchart of FIG. 6, and the numerals in parenthesis correspond to the heading numbers of the respective paragraphs shown below.

(1) First, the user terminal 30 which performs communication record confirmation transmits a communication record confirmation request to the session management section 11 (step S401: confirmation request transmission step).

(2) Upon receiving the communication record confirmation request, the session management section 11 turns on a communication record confirmation flag 70 (step S402).

(3) Then, the user terminal 30 determines whether the communication record buffer 30A contains the designated communication record (step S403).

If there is the communication record, the session management section 11 reads out the designated communication record data based on the temporal record confirmation function 30C, and confirms whether the communication content is completely recorded (step S404). If the designated communication record is not held within the capacity of the communication record data 30A, a communication record difference readout request for acquiring difference data from the complete communication record is made to the session management section 11 (step S406). This means that the user terminal (user terminal) 30 preferentially extracts and uses the record contents in the communication record buffer 30A of its own, and for the lacking communication record which is not stored in the communication record buffer 30A of itself, transmits a confirmation request for the corresponding content to the half-duplex communication device (step S406: confirmation request transmission step).

This enables a communication content confirmation method in which the communication content is also recorded in the communication record buffer, and for the communication record of the length capable of being recorded sufficiently in the communication record buffer, confirmation of the content can be performed in a short period.

On the other hand, if the communication record designated at step S403 is not stored in the communication record buffer 30A, a communication record confirmation request is transmitted to the session management section 11 (step S405: confirmation request transmission step).

If the communication record designated at step S403 is stored in the communication record buffer 30A and it is confirmed at step S404 that the communication content is completely recorded, confirmation of the communication record is performed with the record in the communication record buffer 30A (step S407).

(4) Upon receiving the communication record confirmation request or the communication record difference readout request, the session management section 11 requests the communication record control device 12 to read out the designated communication record, and the communication record control device 12 reads out the communication record of the requested record from the communication record database 20 (step S408).

(5) The communication record control device 12 transmits the communication record read out from the communication record database 20 to the session management section 11.

(6) The session management section 11 transmits the communication record received from the communication record control device 12 to the user terminal 30 based on the communication record transmission function 11B (step S409).

(7) Upon receiving the requested communication record, the user terminal 30 confirms the communication record (step S410).

(8) During the time that the user terminal 30 is confirming the communication record, the user terminal 31 obtains a floor right and transmits a communication content to the session management section 11 (step S420).

(9) Upon receiving the communication content, the session management section 11 records the received content via the communication record control device 12 in the communication record database 20 together with a media burst identifier which is the identifier of the communication content, and transmits the communication content to a user terminal (user terminal 32) which is other than the calling terminal (user terminal 31) and in which no communication record confirmation flag 70 is on (step S421).

Regarding the terminal in which the communication record confirmation flag 70 is on, the session management section 11 checks whether or not there is an extra room in the storage capacity of the communication record buffer 30A (step S422), and if there is any room in the capacity of the communication record buffer 30A, the session management section 11 transmits and stores the communication content in the communication record buffer 30A (step S423). The steps from S422 will be performed on all terminals in which the communication record confirmation flag 70 is on (step S424).

(10) For the terminal in which there is no room in the capacity of the communication record buffer 30A, the session management section 11 maps the user identifier and the media burst identifier in the non-transmission record data map 40 based on the non-transmission record function 11C, and additionally records the fact of non-transmission (step S425). At this stage, the user terminal 30 makes a reply regarding the recording state of the communication record buffer 30A to the session management section 11 to report the record content and the remaining capacity.

When these steps have been completed, the process returns to the original routine (step S426).

Note that the processes in the step S420 and in the step S421 may be repeated.

(11) After communication record confirmation at step S407 or step S410 has been completed, the user terminal 30 transmits a signal indicating that the confirmation has been completed, to the session management section 11 (step S411).

(12) Upon receiving the signal, the session management section 11 inquires the non-transmission record data map 40 that whether there is any non-transmission record for the user terminal 30 (step S412). If there is a non-transmission record, the session management section 11 reads out mapping information, that is, the media burst identifier of the non-transmission data corresponding to the user terminal 30, and makes a communication record readout request for the record corresponding to this media burst identifier to the communication record control device 12 (step S413). If there is no non-transmission record, the communication record confirmation flag 70 is turned off (step S418) and the process ends.

(13) Upon receiving the communication record readout request at step S413, the communication record control device 12 reads out the requested record from the communication record database 20 (step S414).

(14) The communication record control device 12 transmits the communication record read out from the communication record database 20 to the session management section 11.

(15) The session management section 11 transmits the communication record received from the communication record control device 12 to the user terminal 30 which made a request for communication record confirmation (step S415).

The operation of the session management section 11 from step S412 to step S415 is based on the non-transmitted content transmission function 11D. Along with it, the session management section 11 erases the mapping information corresponding to the requested data from the non-transmission record data map 40, based on the non-transmission record erasure function 11E (step S416).

(16) Upon receiving the requested communication record, the user terminal 30 confirms the communication record (step S417).

(17) When there is no non-transmission record in the non-transmission record data map 40, the communication record confirmation flag 70 is turned off (step S418) and the process ends.

(18) During the time when the user terminal 30 is confirming the non-transmitted communication record, if the user terminal 30 obtains a floor right and transmits a communication content to the session management section 11, the session management section 11, upon receiving the communication content, transmits the communication content to a user terminal (user terminal 32) which is not the calling terminal (user terminal 31) and in which the communication record confirmation flag 70 is not on as in the case described after step 420. Regarding the terminal in which the communication record confirmation flag 70 is on, if there is any room in the capacity of the communication record buffer 30A, the session management section 11 transmits and stores the communication content in the communication record buffer 30A. If there is no room in the capacity of the communication record buffer 30A, the session management section 11 maps the user identifier and the media burst identifier in the non-transmission record data map (non-transmission record unit) 40, and additionally records the fact of non-transmission.

If there is a non-transmission record at step S412, the processes at step S420 and step S421 will be repeated each time.

As described above, in the second exemplary embodiment, as the communication record buffers 30A, 31A, and 32A are preferentially used for confirming the communication record, if there is any room in the communication record buffers 30A, 31A, and 32A, the communication content is always recorded in the communication record buffers 30A, 31A, and 32A, and the content is read out from the communication record buffers 30A, 31A, and 32A for confirmation, confirmation of the communication record can be performed without being read from the communication record database 20 so that the time required for confirming the communication record can be reduced.

Third Exemplary Embodiment

Next, a third exemplary embodiment will be described.

FIG. 8 is a block diagram showing the configuration of a half-duplex communication system of the third exemplary embodiment.

In FIG. 8, the half-duplex communication system includes a half-duplex communication device 110, a communication record database 120, user terminals 130, 131, and 132, a non-transmission record data map 140 which, when communication contents are not transmitted to any one of the user terminals 130, 131, and 13, records the fact of non-transmission by each of the user terminals 130, 131, and 132, a member registration device 150 in which groups of performing communication and their members are registered, and a communication record confirmation flag 170.

The half-duplex communication device 110, the communication record database 120, the user terminals 130, 131, and 132, the non-transmission record data map 140, the member registration device 150, and the communication record confirmation flag 170 are respectively have the same functions as those of the half-duplex communication device 10, the communication record database 20, the user terminals 30, 31, and 32, the non-transmission record data map 40, the member registration device 50, and the communication record confirmation flag 70 of the first exemplary embodiment shown in FIG. 1.

Further, a session management section 111, a communication record management section 112, and a floor right management section 113 of the half-duplex communication device 110 respectively have the same functions as those of the session management section 11, the communication record management section 12, and the floor right management section 13 of the first exemplary embodiment. Furthermore, a database drive control function 111A, a communication record transmission function 111B, a non-transmission record function 111C, a non-transmitted content transmission section 111D, and a non-transmission record erasure function 111E of the session management section 111 respectively have the same functions as those of the database drive control function 11A, the communication record transmission function 11B, the non-transmission record function 11C, the non-transmitted content transmission section 11D, and the non-transmission record erasure function 11E of the first exemplary embodiment.

The third exemplary embodiment is different from the first exemplary embodiment in that, unlike the user terminals 30 and 31 shown in FIG. 1, the user terminals 130 and 131 do not have communication record buffers and a temporal record confirmation function of confirming the communication record buffers.

(Operation: Storing in Communication Record Database)

Next, operation of the third exemplary embodiment will be described in accordance with the drawings.

First, Storing in the communication record database 120 will be performed in the following procedures.

(1) The session management section 111 reads out user terminals belonging to a communication group which performs communications this time from the group member registration device 150 and stores the terminals.

(2) The session management section 111 receives communication contents from a calling terminal 131 to which a floor right is given by the floor right management section 113 of the caller.

(3) The session management section 111 transmits the received content to the communication record control device 112 by the database drive control unit 111A, together with the receiving terminals 130 and 132.

(4) When the communication record control device 112 receives the communication content from the session management section 111, the communication record control device 112 stores the communication content in the communication record database 120, with a media burst identifier which is an identifier of the communication content.

The processes from (1) to (4) are performed each time communications are performed. Note that these respective steps are almost the same as the processing steps of the first exemplary embodiment shown in FIG. 2.

(Operation: Communication Record Confirmation Requesting Process)

Next, a process when the user terminal 130 makes a communication record confirmation request will be described in accordance with a flowchart shown in FIG. 9.

(1) The user terminal 130 which performs communication record confirmation transmits a communication record confirmation request to the session management section 111 (step S501).

(2) Upon receiving the communication record confirmation request, the session management section 111 transmits a communication record readout request to the communication record control device 112 and turns on a communication record confirmation flag 170 (step S502).

(3) Upon receiving the communication record readout request, the communication record control device 112 reads out the requested record from the communication record database 120.

(4) The communication record control device 112 transmits the communication record, reads out from the communication record database 120, to the session management section 111 based on the communication record transmission function 111B (step S503).

(5) The session management section 111 transmits the communication record received from the communication record control device 112 to the user terminal 130 which made a request for communication record confirmation (step S504).

(6) Upon receiving the communication record, the user terminal 130 confirms the communication record (step S505).

(7) During the time that the user terminal 130 is confirming the communication record, the user terminal 131 obtains a floor right and transmits a communication content to the session management section (step S520).

(8) Upon receiving the communication content, the session management section 111 transmits the communication content to a user terminal 132 which is other than the calling terminal 131 and in which no communication record confirmation flag 170 is on (step S521). Regarding the terminal in which the communication record confirmation flag 170 is on, the session management section 111 maps the user identifier and the media burst identifier in the non-transmission record data map 140 based on the non-transmission record function 111C, and additionally records the fact of non-transmission (step S522). Note that the processes in step S520 to step S522 may be repeated.

(9) After completing communication record confirmation, the user terminal 130 transmits a signal indicating that the confirmation has been completed to the session management section 111 (step S506).

(10) Upon receiving the signal, the session management section 111 inquires the non-transmission record data map 140 that whether there is any non-transmission record (step S507). If there is a non-transmission record, the session management section 111 reads out mapping information, that is, the media burst identifier of the non-transmitted data corresponding to the user terminal 130, and makes a communication record readout request for the record corresponding to the media burst identifier, to the communication record control device 112 (step S508). If there is no non-transmission record, the communication record confirmation flag 170 is turned off (step S513) and the process ends.

(11) Upon receiving the communication record readout request, the communication record control device 112 reads out the requested record using the media burst identifier from the communication record database 120 (step S509).

(12) The communication record control device 112 transmits the communication record read out from the communication record database 120 to the session management section 111.

(13) The session management section 111 transmits the communication record received from the communication record control device 112 to the user terminal 130 which made a request for communication record confirmation (step S510). The operation of the session management section 111 from step S507 to step S510 is based on the non-transmitted content transmission function 111D. Along with it, the session management section 111 erases the mapping information corresponding to the requested data from the non-transmission record data map 140, based on the non-transmission record erasure function 111E (step S511).

(14) Upon receiving the requested communication record, the user terminal 130 confirms the communication record (step S512).

If there is any non-transmission record at (10) above, the processes from step S506 to step S512 will be repeated each time.

According to the third exemplary embodiment, as the record device which records communication content is not distributed into the communication record buffers 30A, 31A, and 32A and the communication record database 20 as in the first exemplary embodiment but is comprehensively managed, processes of communication record can be performed in a simpler manner.

Fourth Exemplary Embodiment

Next, a fourth exemplary embodiment will be described.

FIG. 10 is a block diagram showing the configuration of the fourth exemplary embodiment of a half-duplex communication system of the present invention. The fourth exemplary embodiment is different from the first exemplary embodiment in that user terminals 230 and 231 do not include communication record buffers, and that a media combining device 260 is provided.

As such, in the fourth exemplary embodiment, the half-duplex communication system includes the media combining device (media combining unit) 260 which separates/combines and outputs communication contents for each medium, and the user terminals (user terminal) 230, 231, and 232 respectively include record content acquisition confirmation functions 230B, 231B, and 232B which cause the half-duplex communication device 210 to read out records of communication contents stored in the communication record database 220 so as to confirm past communication records.

Further, the session management section 211 of the half-duplex communication device 210 has a database drive control function 211A which performs transmission of communication contents received from a calling terminal 231 to the communication record database 220 via the communication record control device 212, and transmission of the communication contents to the media combining unit 260, and a communication record transmission function 211B which controls readout of communication record recorded in the communication record database 220 via the communication record control device 212, and transmission of the communication records to the media combining unit 260.

Further, the session management section 211 has a mixing information transmission function 211C which, in response to a readout request for communication records based on the record content acquisition confirmation function from any one of the receiving terminals 230 and 231, combines the received communication contents and the communication record read out by the communication record transmission function 211B by each medium by the media combining device 260, and transmits the combined result to the receiving terminal.

The fourth exemplary embodiment includes a non-transmission record data map 240, a non-transmission record function 211D, a non-transmission content transmission function 211E, and a non-transmission record erasure function 211F corresponding to the non-transmission record data map 40, the non-transmission record function 11C, the non-transmitted content transmission function 11D, and the non-transmission record erasure function 11E of the first exemplary embodiment. A component corresponding to the communication record confirmation flag 70 of the first exemplary embodiment is not provided.

When receiving a communication content, the media combining device 260 separates the communication contents into respective media such as voice and moving picture, and converts the data to be in a format in which communication contents can be confirmed at the same time by each medium. For example, conversion is performed such that if the communication content is a voice, the media combining device 260 performs mixing of the voice itself, and if the communication content is a moving picture, the media combining device 260 displays the moving picture on two screens of the terminal.

(Description of Operation)

Next, Operation of the fourth exemplary embodiment will be described in accordance with the flowchart shown in FIG. 11.

In the fourth exemplary embodiment, if the user terminal 230 makes a communication record confirmation request, the following processes will be performed.

(1) The user terminal 230 which performs communication record confirmation transmits a communication record confirmation request to the session management section 211 based on the record content acquisition confirmation function 230B (step S601).

(2) Upon receiving the communication record confirmation request, the session management section 211 transmits a communication record readout request to the communication record control device 212 and turns on a communication record confirmation flag 270 (step S602).

(3) Upon receiving the communication record readout request, the communication record control device 212 reads out the requested record from the communication record database 220 (step S603).

(4) The communication record control device 212 transmits the communication record read out from the communication record database 220 to the session management section 211.

(5) The session management section 211 transmits the communication record received from the communication record control device 212 to the user terminal 230 which made a request for communication record confirmation (step S604).

(6) Upon receiving the communication record, the user terminal 230 confirms the communication record (step S605).

(7) During the time that the user terminal 230 is confirming the communication record, the user terminal 231 obtains a floor right and transmits a communication content to the session management section (step S620).

(8) Upon receiving the communication content, the session management section 211 transmits the communication content to a user terminal (user terminal 232) which is other than the calling terminal (user terminal 231) and in which no communication record confirmation flag 270 is on (step S621).

Regarding the terminal in which the communication record confirmation flag 270 is on, if both conditions that the communication record confirmation flag 270 is on and the user terminal 231 has acquired a floor right are satisfied (step S606), the session management section 211 transmits the communication content which is confirmed by the user terminal 230 and the communication content transmitted from the user terminal 231, to the media combining device 260 (step S607).

(9) Upon receiving the communication content confirmed by the user terminal 230 and the communication content transmitted from the user terminal 231, the media combining device 260 performs mixing of the communication content by each medium such as a voice and a moving picture (step S608).

(10) The media combining device 260 transmits the mixed communication content to the session management section 211.

(11) Upon receiving the mixed communication record, the session management section 211 transmits the communication record to the user terminal 230 (step S609: communication content extraction step).

As such, this series of communication content extraction steps are configured such that the communication content of the extracted communication record and the communication content output by another user terminal (user terminal) based on a floor right, during the transmission being performed, are mixed for each medium and transmitted to the user terminal (one user terminal).

(12) Upon receiving the mixed communication record, the user terminal 30 confirms the communication record.

According to the fourth exemplary embodiment, by mixing contents by the media combining device, a user terminal is able to confirm a past communication record and a current communication content, whereby a half-duplex communication can be continued by receiving the current communication content while confirming a past communication record.

Fifth Exemplary Embodiment

Next, a fifth exemplary embodiment will be described.

FIG. 11 is a block diagram showing the configuration of the fifth exemplary embodiment. The configuration of the fifth exemplary embodiment is different from the first exemplary embodiment in that respective user terminals 330 and 331 do not have communication record buffers, and that a non-reception state setting function 311C is provided to the session management section 311 of the half-duplex communication device 310.

The user terminals 330, 331, and 332 respectively have a record content acquisition confirmation function of causing the half-duplex communication device 310 to read out records of communication contents recorded in the communication record database 320 so as to confirm past communication records. The session management section 311 has a communication control function of controlling recording of communication contents received from the user terminal 331, which is the calling terminal, in the database 320 and readout of communication records, and a non-reception state setting function 311C of, in response to the communication record readout request based on a record content acquisition confirmation function from any one of the user terminals 330 and 332 which are receiving terminals, enabling confirmation of communication records after giving a floor right to the receiving terminal and halting reception from another user terminal.

Further, the fourth exemplary embodiment is configured to include a non-transmission record data map 340, a group member registration device 350, a non-transmission record function 311D, a non-transmitted content transmission function 311E, and a non-transmission record erasure function 311F, respectively corresponding to the non-transmission record data map 40, the group member registration device 50, the non-transmitted record function 11D, the non-transmitted content transmission function 11D, and the non-transmission record erasure function 11F. Note that a component corresponding to the communication record confirmation flag 70 of the first exemplary embodiment is not provided.

In the fifth exemplary embodiment, a flowchart of a process when the user terminal 330 makes a communication record confirmation request is shown in FIG. 13.

(Operation: Communication Record Confirmation Requesting Process)

Next, a process when a communication record confirmation request is made in this exemplary embodiment will be described based on FIG. 13.

(1) First, the user terminal 330 which performs communication record confirmation transmits a communication record confirmation request to the session management section 311 (step S701).

(2) Upon receiving the communication record confirmation request, the session management section 311 transmits a communication record readout request to the communication record control device 312 and allocates a floor right to the user terminal 330 which made the communication record confirmation request (step S702). In a state where the user terminal 330 has a floor right, the user terminals 331 and 332 are not able to transmit communication contents.

(3) Upon receiving the communication record readout request, the communication record control device 312 reads out the requested record from the communication record database 320 (step S703).

(4) The communication record control device 312 transmits the communication record, read out from the communication record database 320, to the session management section 311.

(5) The session management section 311 transmits the communication record received from the communication record control device 312 to the user terminal 330 which made a request for communication record confirmation (step S704).

(6) Upon receiving the requested communication record, the user terminal 330 confirms the communication record (step S705).

(7) When completing the communication record confirmation, the user terminal 330 transmits a signal indicating that confirmation has been completed in the session management section 311 (step S706).

(8) The session management section 311 releases the floor right allocated to the user terminal 330 (step S707).

(9) Then, the process is back to the process before the user terminal 330 made the communication record confirmation request (step S708).

According to the fifth exemplary embodiment, by allocating a floor right to the user terminal which made a communication record confirmation request at the time of communication record confirmation, confirmation is performed while halting the flow of half-duplex communication. As such, non-transmitted communication content will never be generated due to communication record confirmation, so that the subsequent processes can easily be performed.

Note that in the above-described first to fifth exemplary embodiments, when a user terminal receiving a requested communication record confirms the communication record, the readout speed of the communication record can be set to be any speeds, that is, a double speed for example. In that case, a user can complete confirmation faster than the case of confirming the communication record at a normal speed.

Although, in the above description, the case of performing half-duplex communications using three user terminals has been described as an example, the user terminals 30, 130, 230, and 330 are terminals requesting a communication record confirmation, the user terminals 31, 131, 231, and 331 are terminals obtaining a floor right during a communication record confirmation being performed and performing communications, and the user terminals 32, 132, 232, and 332 are terminals receiving communication contents during the time that another terminal confirms a communication record. All of which are shown as examples, and the number of terminals are not limited thereto. Further, the functions of the terminals may be switched dynamically in accordance with the used state.

Note that in the respective exemplary embodiments described above, the respective steps according to the confirmation method of communication record content may be configured such that the operational contents are programmed and allowed to be executed by a computer. With such a configuration, the same confirmation processes as those in the respective steps according to the confirmation method of communication record contents in the above-described exemplary embodiments can be performed, and the above-described object of the present invention can be achieved effectively.

As the present invention is configured and functions as described above, a communication content is recorded together with an identifier and is made readable when a request by a user terminal is made. As such, it is possible to realize a half-duplex communication system, a communication content confirmation method and a communication content confirmation processing program in the half-duplex communication system, capable of executing confirmation of a past communication record by a user terminal even when half-duplex communication are being performed, capable of executing confirmation of the communication record while maintaining a communication content which is being communicated currently, and also capable of confirming communication contents during communication record confirmation without fail.

A half-duplex communication system according to another exemplary embodiment of the invention is a half-duplex communication system which may include a half-duplex communication device which controls and manages half-duplex communications in which communications can be performed in only one direction at a time, and a plurality of user terminals which perform half-duplex communications via the half-duplex communication device, and may be configured such that the half-duplex communication device has a communication record database in which a communication content of the half-duplex communications performed via the half-duplex communication device is recorded together with its identifier, and includes a floor right setting management section which sets a floor right to one of the plurality of user terminals, with which the one user terminal may be a calling terminal in preference to the other user terminals, and a session management section which receives a communication content sent from the calling terminal with the floor right, relays and transmits the communication content to a receiving terminal which is the user terminal other than the calling terminal, and manages communication states of the half-duplex communications. The half-duplex communication device may also includes, in addition to the session management section, a communication record control section which reads out a communication record of the communication content from the communication record database in response to a request from the session management section.

The half-duplex communication system may be configured such that the user terminal includes a record content acquisition confirmation unit which acquires the communication record in the communication record database with respect to the half-duplex communication device and confirms the communication record, and the session management section of the half-duplex communication device includes a database drive control unit which performs writing and readout of the communication content, transmitted from the calling terminal, to and from the communication record database via the communication record control section, and a communication record transmission unit which, when an acquisition request for the communication record recorded in the communication record database is made from the user terminal, reads out the corresponding communication record from the communication record database via the communication record control section and transmits the communication record to the user terminal.

In the half-duplex communication system, each of the user terminals may be configured as to include a communication record buffer which temporarily stores the communication content, and a unit which preferentially records a communication content transmitted or received by itself in the communication record buffer of itself.

In the half-duplex communication system, the record content acquisition confirmation unit with respect to the half-duplex communication device, which is provided to each of the user terminals, may be configured as to preferentially confirm the communication record buffer of itself, and for the part not recorded in the communication record buffer, request the session management section to acquire the communication record.

In the half-duplex communication system, the half-duplex communication device may be configured as to further include a media combining unit which separates the communication content by each media or combines the communication content and outputs it, in which the media combining unit has a combined media sending unit which inputs, from the half-duplex communication device, the communication record received by the user terminal performing the record content acquisition confirmation function on the half-duplex communication device and a communication content sent from another user terminal which acquired the floor right and is executing the floor right, and mixes the communication record and the communication content by each media, and transmits the resultant to the session management section, and the session management section has a mixing information transmission unit which transmits the mixed communication content to the user terminal performing the record content acquisition confirmation function.

In the half-duplex communication system, the user terminal may include a record content acquisition confirmation unit which requests the half-duplex communication device for the communication record recorded in the communication record database, and confirms the communication record, and the session management section of the half-duplex communication device may have a database drive control function of controlling writing and readout operation of the communication content with respect to the communication record database via the communication record control section, and a non-receiving state setting unit which, when the record content acquisition confirmation function is executed by any of the receiving terminals, gives a floor right based on that function and allows confirmation of the communication record after halting the transmitting operation of other user terminals.

In the half-duplex communication system, the session management section may be configured as to include a non-transmission record unit which, when a state where communication contents are not transmitted to any of the user terminals is caused, records the fact of non-transmission together with the identifier of the user terminal in a non-transmission record unit which has been provided beforehand, a non-transmitted content transmission unit which, when the user terminal has completed confirmation of the communication record with respect to the fact of non-transmission recorded in the non-transmission record unit or when the communication has ended, reads out the non-transmitted communication record from the communication record database and transmits it to the user terminal, and a non-transmission record erasure unit which, when the communication record of non-transmission is transmitted, erases the corresponding non-transmission record from the non-transmission record unit each time.

A communication content confirmation method according to another exemplary embodiment of the invention, in a half-duplex communication system including a half-duplex communication device which controls and manages operation of half-duplex communications in which communications are alternately performed in one direction, and a plurality of user terminals which perform half-duplex communications via the half-duplex communication device, may be configured to include, recording a communication content of half-duplex communications performed between the plurality of user terminals via the half-duplex communication device in a communication record database by associating the communication content with an identifier thereof, transmitting a confirmation request for parts of the communication record recorded in the communication record database from one user terminal of the plurality of user terminals to the half-duplex communication device, and receiving the confirmation request from the one user terminal operating the half-duplex communication device based on the request and extracting, and sending to the one user terminal, the corresponding communication content from the communication record stored in the communication record database.

The communication content confirmation method may be configured such that when recording the communication content, the communication content transmitted or received by the respective user terminals are preferentially recorded in the communication record buffer of itself.

The communication content confirmation method may be configured such that when transmitting the confirmation request, the one user terminal preferentially extracts and uses the record content in the communication record buffer of itself provided beforehand, and for communication record which is not stored in the communication record buffer of itself, transmits a confirmation request of the corresponding content to the half-duplex communication device.

The communication content confirmation method may be configured such that when extracting the communication content, mixing, by each medium, the extracted record content of the communication record and a communication content sent by another user performing transmission based on the floor right, and transmitting the resultant to the one user terminal.

The communication content confirmation method may be configured to include, when a state where communication contents are not transmitted to any of the user terminals is caused, recording the fact of non-transmission together with the identifier of the user terminal in a non-transmission record unit provided beforehand, and when the user terminal has completed confirmation of the communication record with respect to the fact of non-transmission stored in the non-transmission record unit or when the communication has ended, reading out the non-transmitted communication record from the communication record database and transmitting it to the user terminal, and when the communication record of non-transmission is transmitted, erasing the corresponding non-transmission record from the non-transmission record unit each time.

A communication content confirmation program according to another exemplary embodiment of the invention, in a half-duplex communication system including a half-duplex communication device which controls and manages operation of half-duplex communications in which communications are alternately performed in one direction, and a plurality of user terminals which perform half-duplex communications via the half-duplex communication device, may be configured to cause a computer provided to the half-duplex communication device to execute a communication content record function of recording a communication content of half-duplex communications performed between the plurality of user terminals via the half-duplex communication device in a communication record database by associating the communication content with an identifier thereof, a confirmation request receiving function of receiving a confirmation request for parts of the communication record stored in the communication record database from one user terminal of the plurality of user terminals to the half-duplex communication device when the request has been transmitted, and a communication content extraction transmission function of operating the half-duplex communication device based on the confirmation request from the one user terminal and extracting, and sending to the one user terminal, the corresponding communication content from the communication record stored in the communication record database.

The communication content confirmation program may be configured such that when recording the communication content, the communication content transmitted or received by the respective user terminals is preferentially recorded in the communication record buffer of itself.

The communication content confirmation program may be configured such that when transmitting the confirmation request, the one user terminal preferentially extracts and uses the record content in the communication record buffer of itself provided beforehand, and for lacking communication record which is not stored in the communication record buffer of itself, transmits a confirmation request for the corresponding content to the half-duplex communication device.

The communication content confirmation program may be configured such that when extracting the communication content, the extracted record content of the communication record and a communication content sent by another user performing transmission based on the floor right are mixed by each medium, and the resultant is transmitted to the one user terminal.

The communication content confirmation program may be configured to include, together with the confirmation request transmission function, a non-transmission record processing function of, when a state where communication contents are not transmitted to any of the user terminals is caused, recording the fact of non-transmission together with the identifier of the user terminal in a non-transmission record unit provided beforehand, a non-transmission record transmission processing function of, when the user terminal has completed confirmation of the communication record with respect to the fact of non-transmission stored in the non-transmission record unit or when the communication has ended, reading out the non-transmitted communication record from the communication record database and transmitting it to the user terminal, and a non-transmission record erasure function of, when the communication record of non-transmission is transmitted, erasing the corresponding non-transmission record from the non-transmission record unit each time, and cause the computer to execute these function.

While the present invention has been described with reference to the embodiments (and examples), the present invention is not limited to these embodiments (and examples). Various changes in form and details of the present invention, which can be understood by a person skilled in the art, may be made within the scope of the present invention.

INDUSTRIAL APPLICABILITY

As the present invention is configured and works as described above, the present invention is widely applicable in the fields of group communications using half-duplex communications including PoC and transceivers, and of communication industry such as remote meeting system using half-duplex communications including PoC and transceivers.

Figure 1:
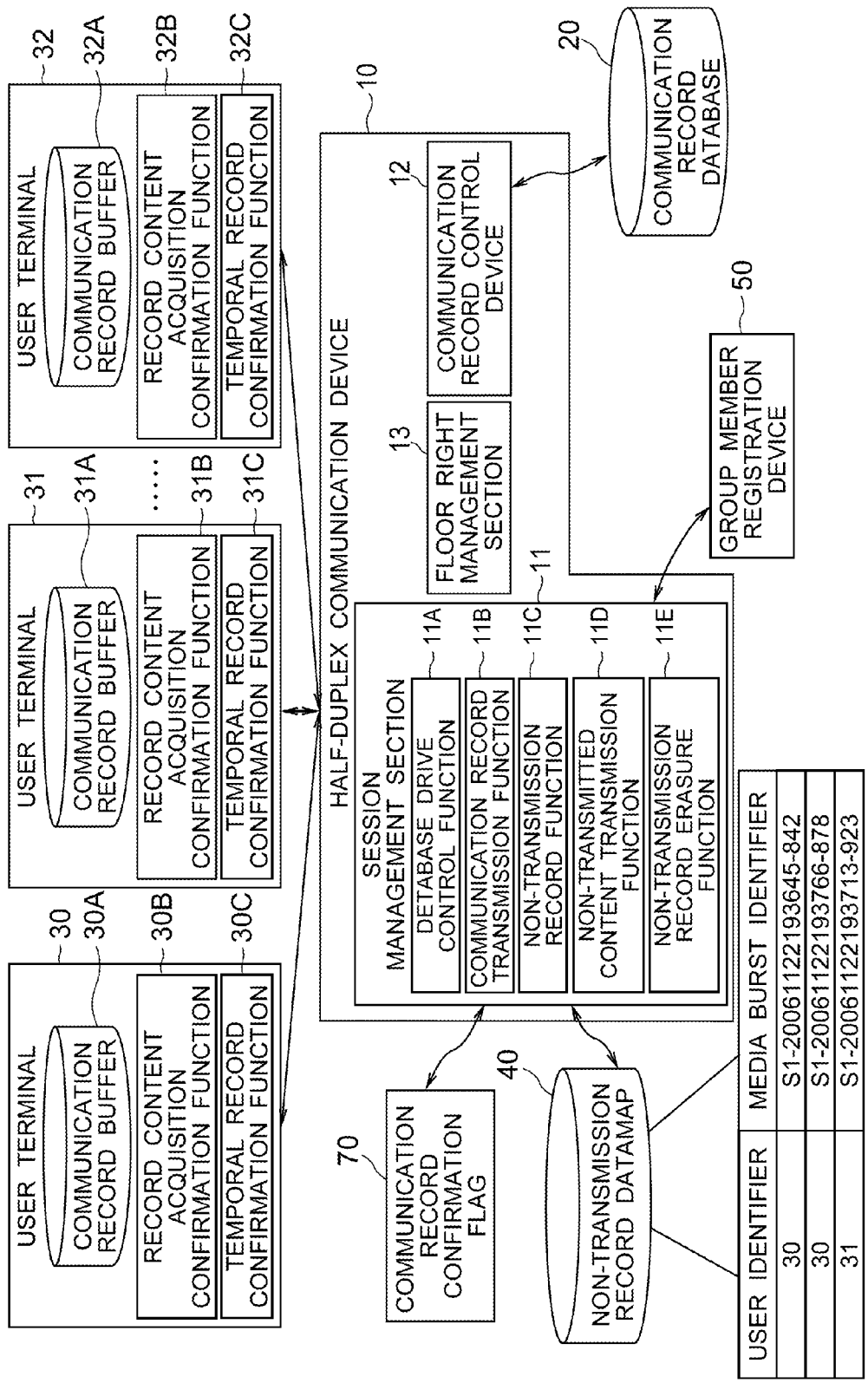
FIG. 1 is a block diagram showing a first exemplary embodiment of a half-duplex communication system according to the invention.
Figure 2:
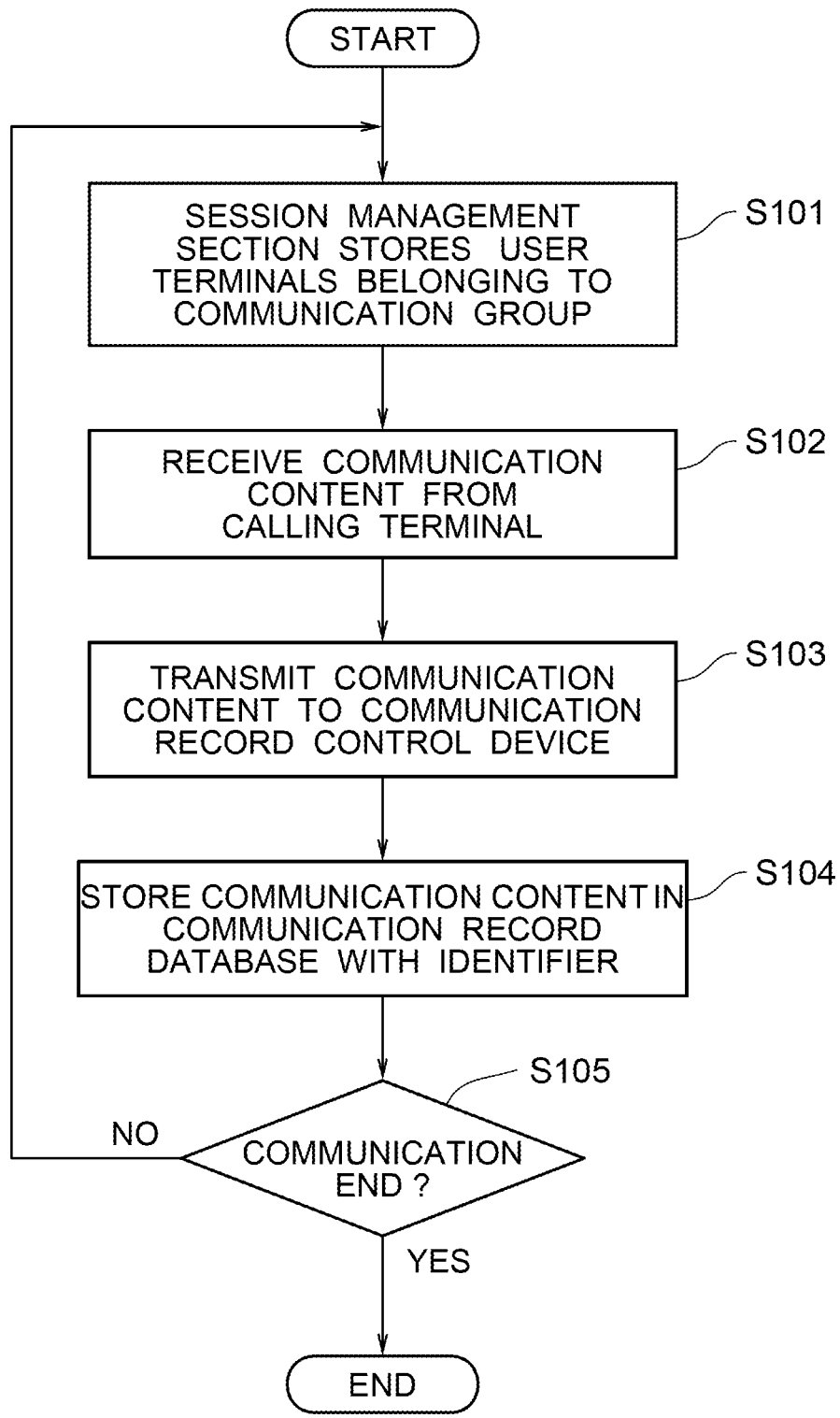
FIG. 2 is a flowchart showing the procedures of storing communication content data in a communication record database in the first exemplary embodiment shown in FIG. 1.
Figure 3:
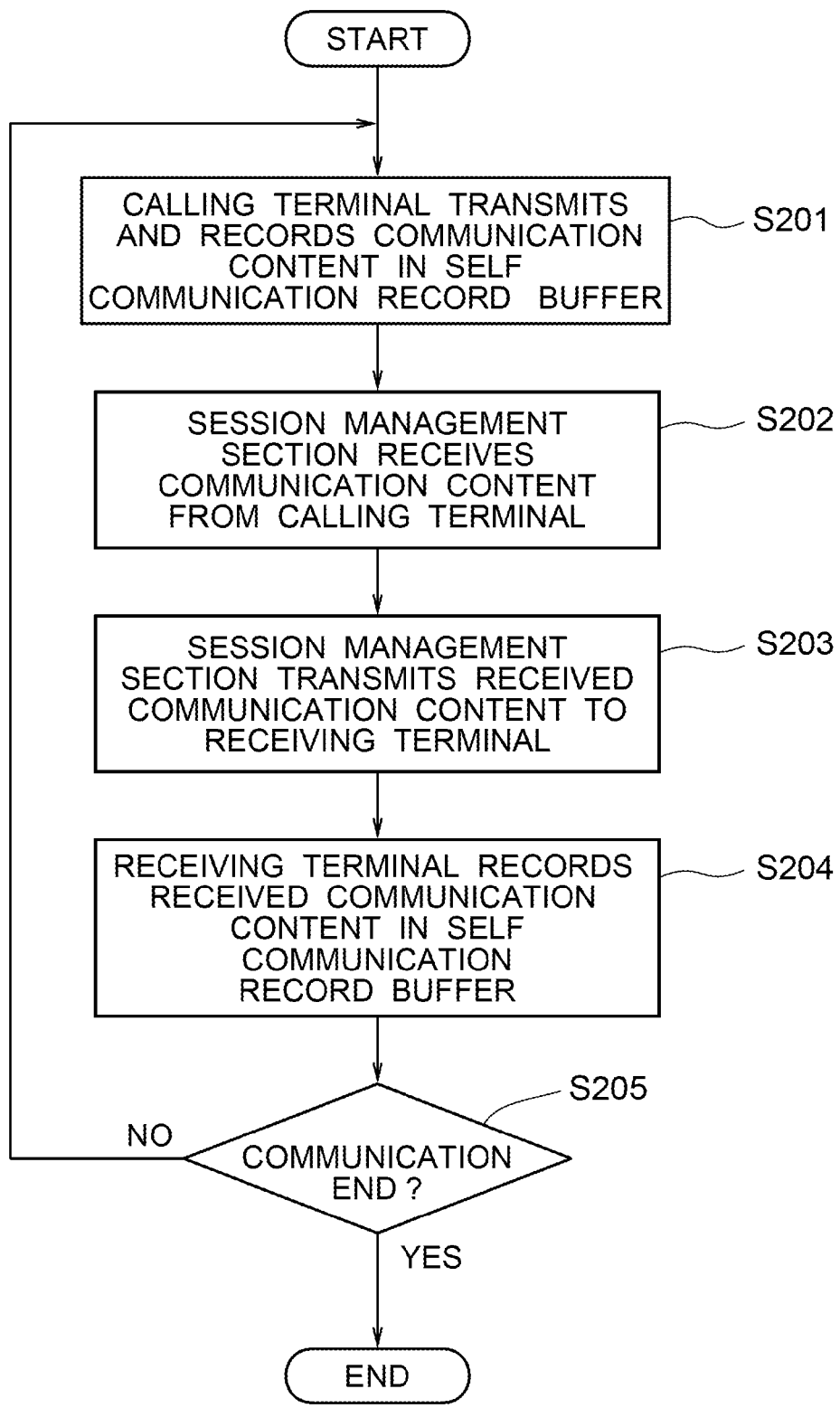
FIG. 3 is a flowchart showing the procedures of storing communication content data in a communication record buffer of a user terminal in the first exemplary embodiment.
Figure 4:
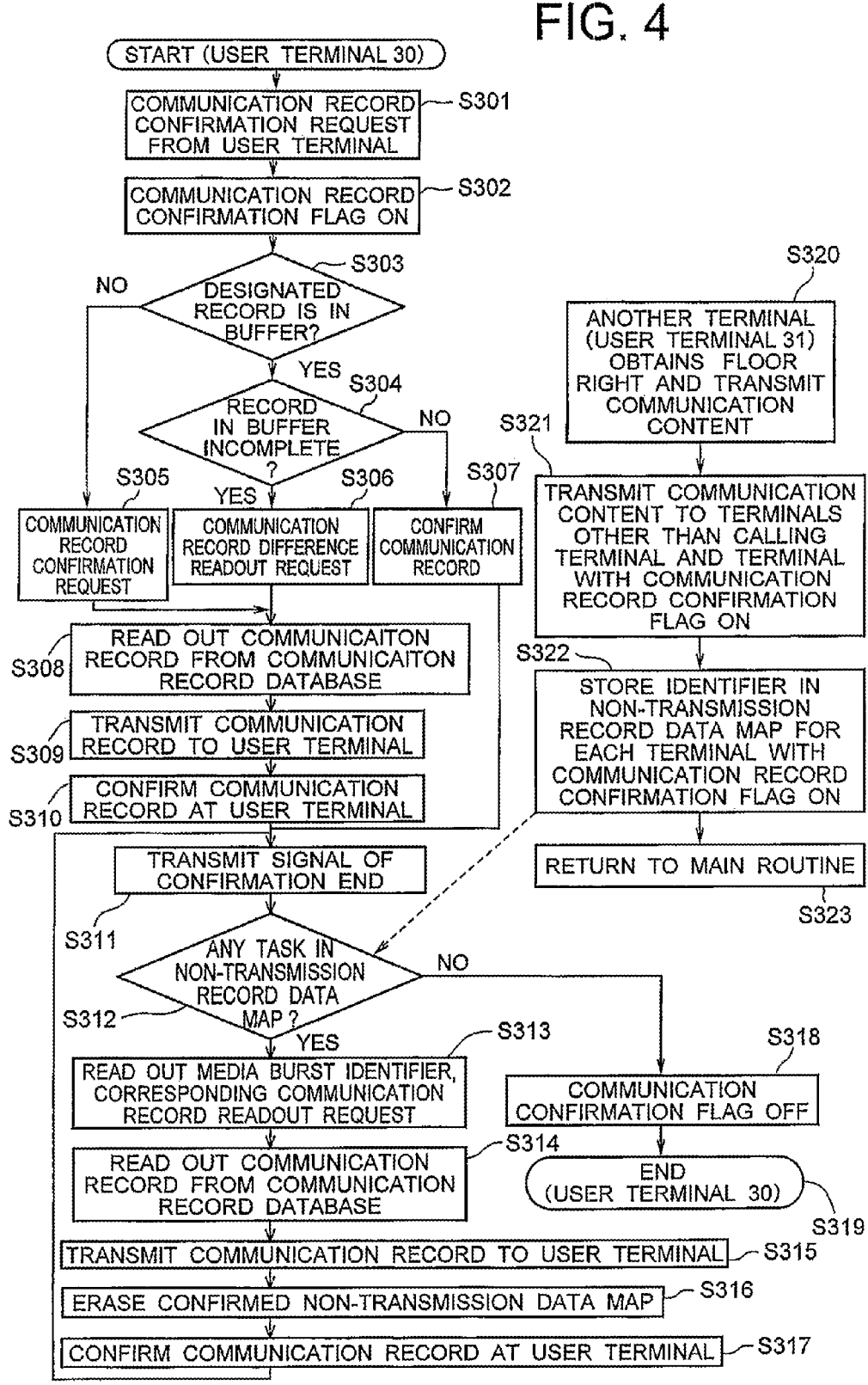
FIG. 4 is a flowchart showing a process for responding to a communication record confirmation request from a user terminal in the first exemplary embodiment.
Figure 5:
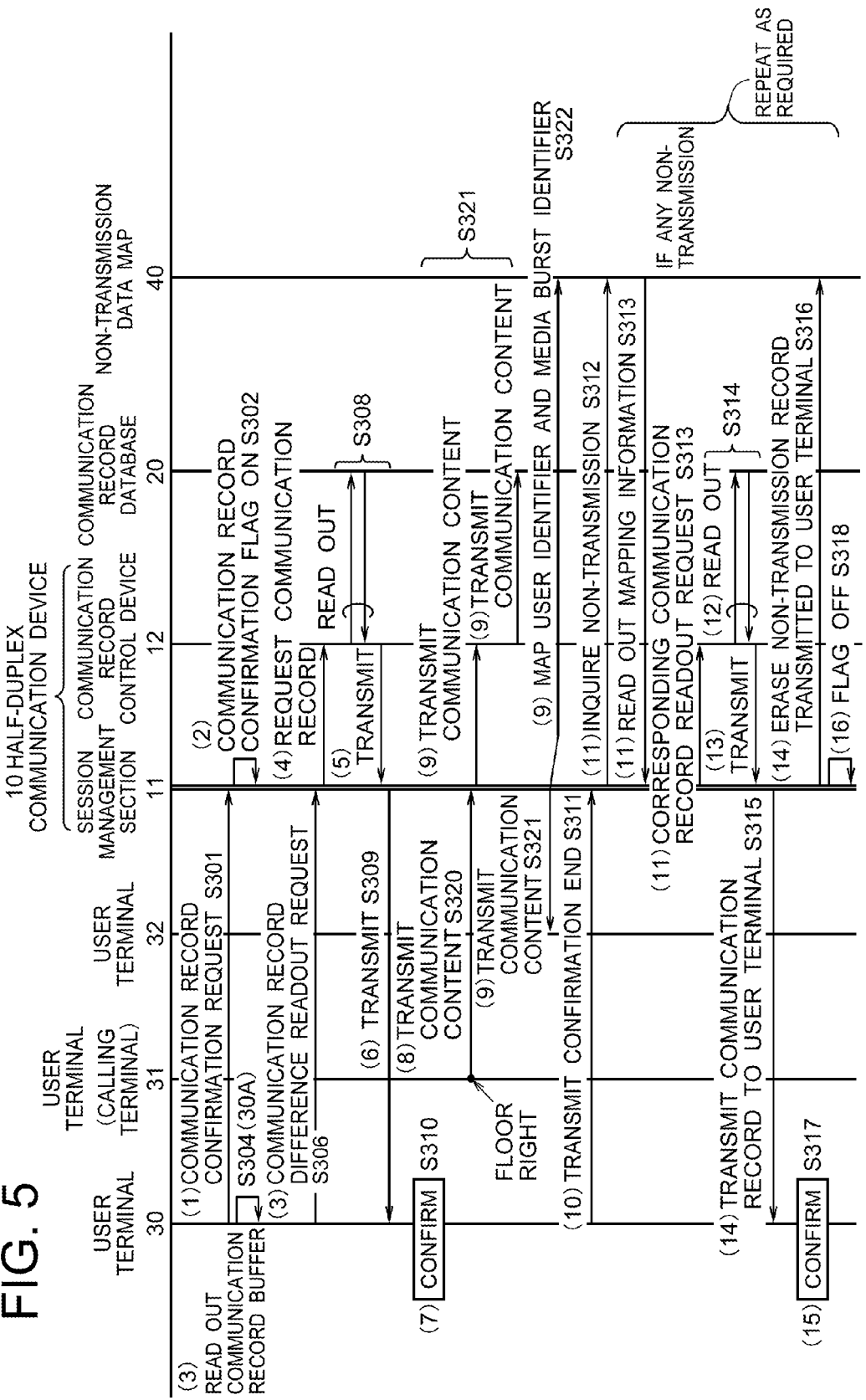
FIG. 5 is a time chart showing the processing operation responding to the communication record confirmation request from the user terminal in the first exemplary embodiment.
Figure 6:
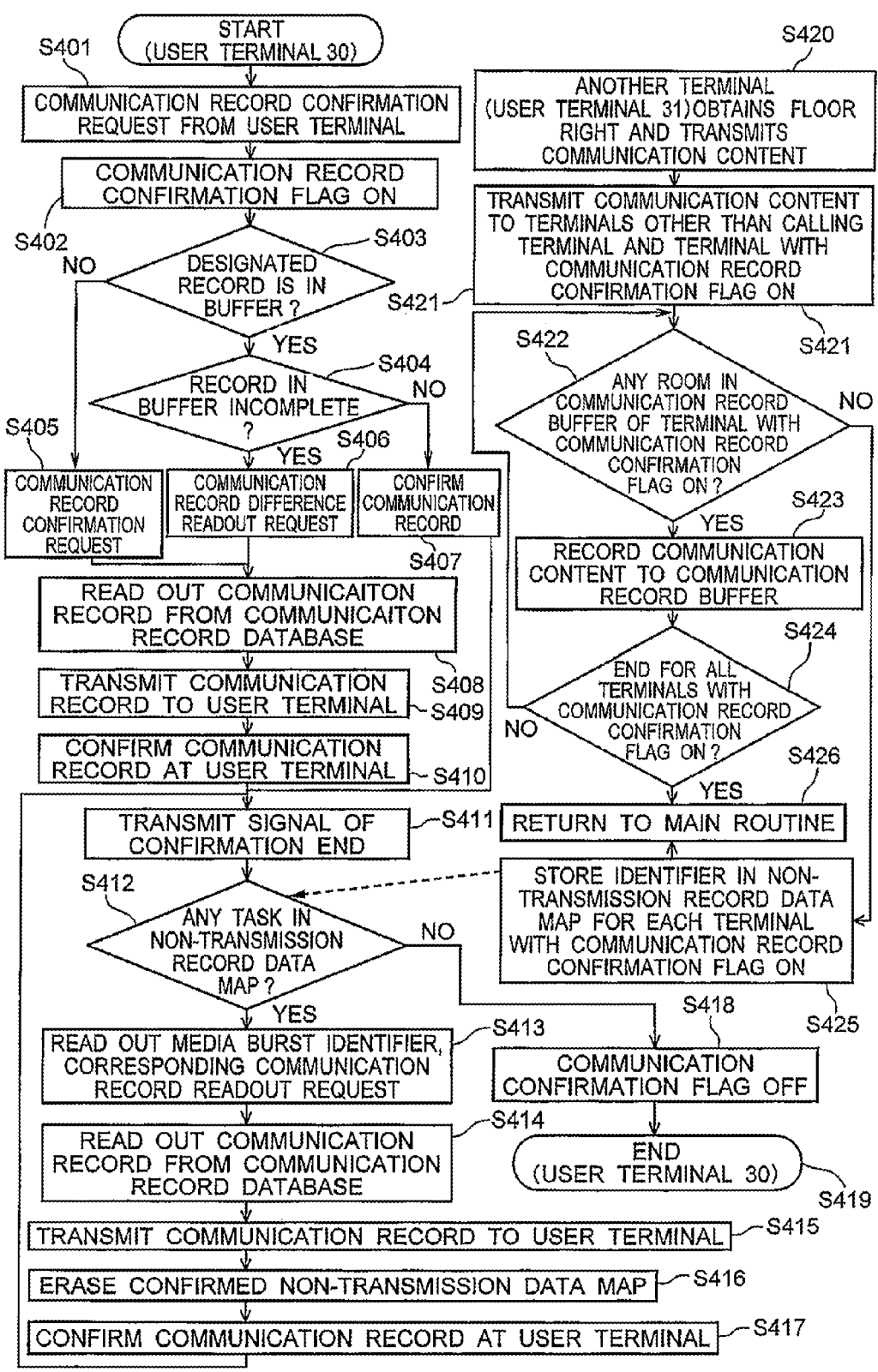
FIG. 6 is a flowchart showing the processing procedures responding to a communication record confirmation request from a user terminal in a second exemplary embodiment of the invention.
Figure 7:
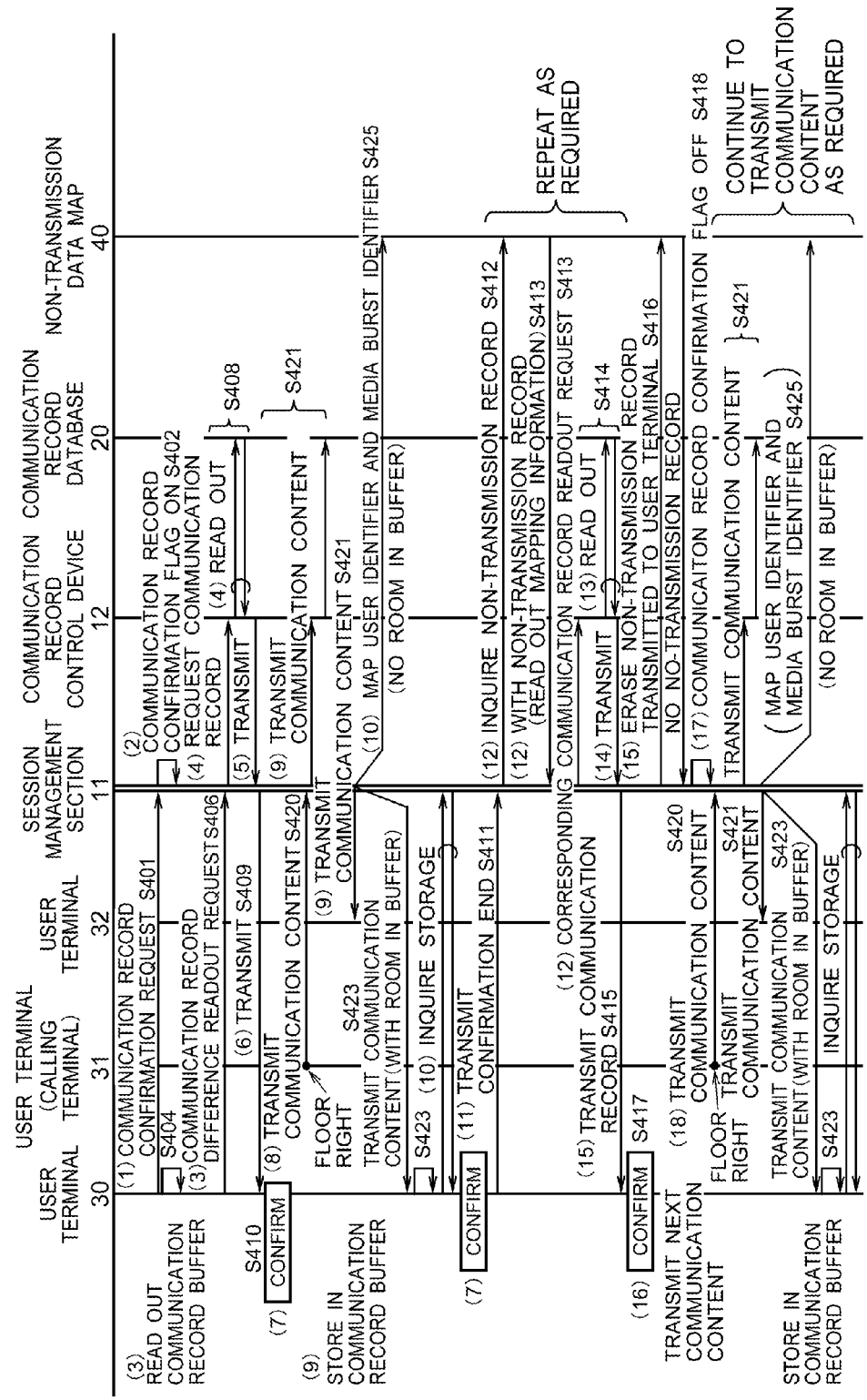
FIG. 7 is a time chart showing the processing operation responding to the communication record confirmation request from the user terminal in the second exemplary embodiment.
Figure 8:
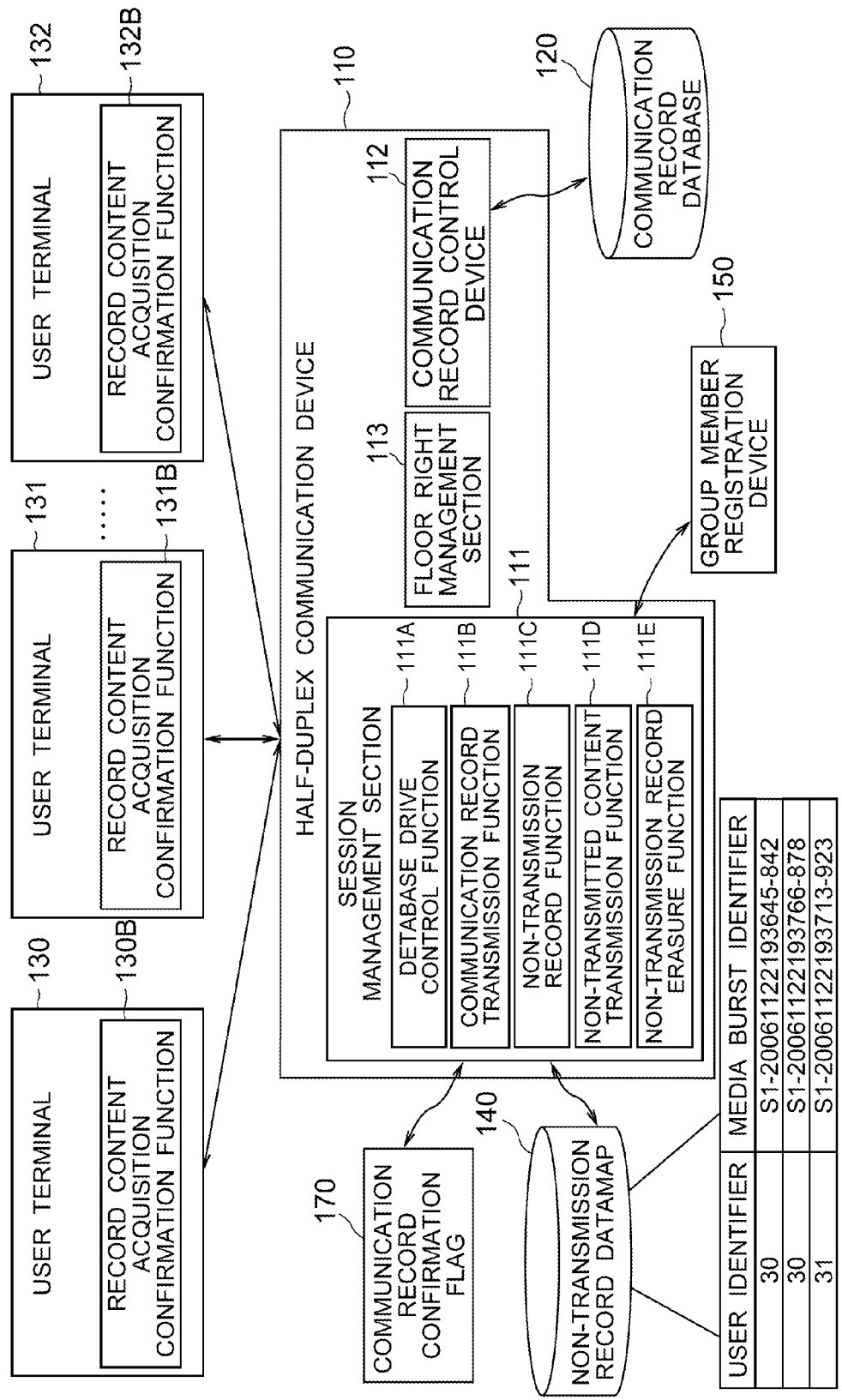
FIG. 8 is a block diagram showing a third exemplary embodiment of a half-duplex communication system according to the invention.
Figure 9:
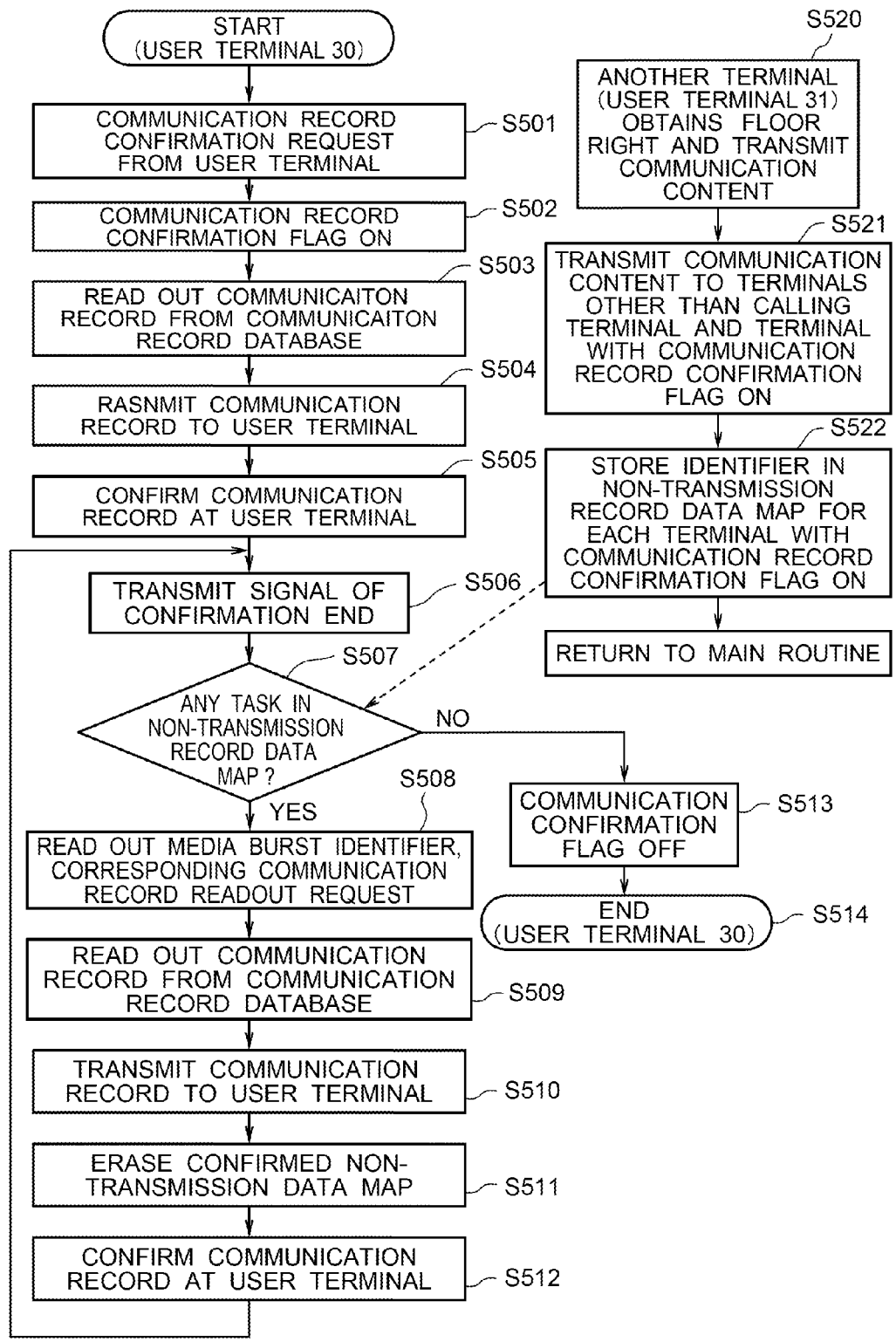
FIG. 9 is a flowchart showing the processing procedures responding to a communication record confirmation request from a user terminal in the third exemplary embodiment shown in FIG. 8.
Figure 10:
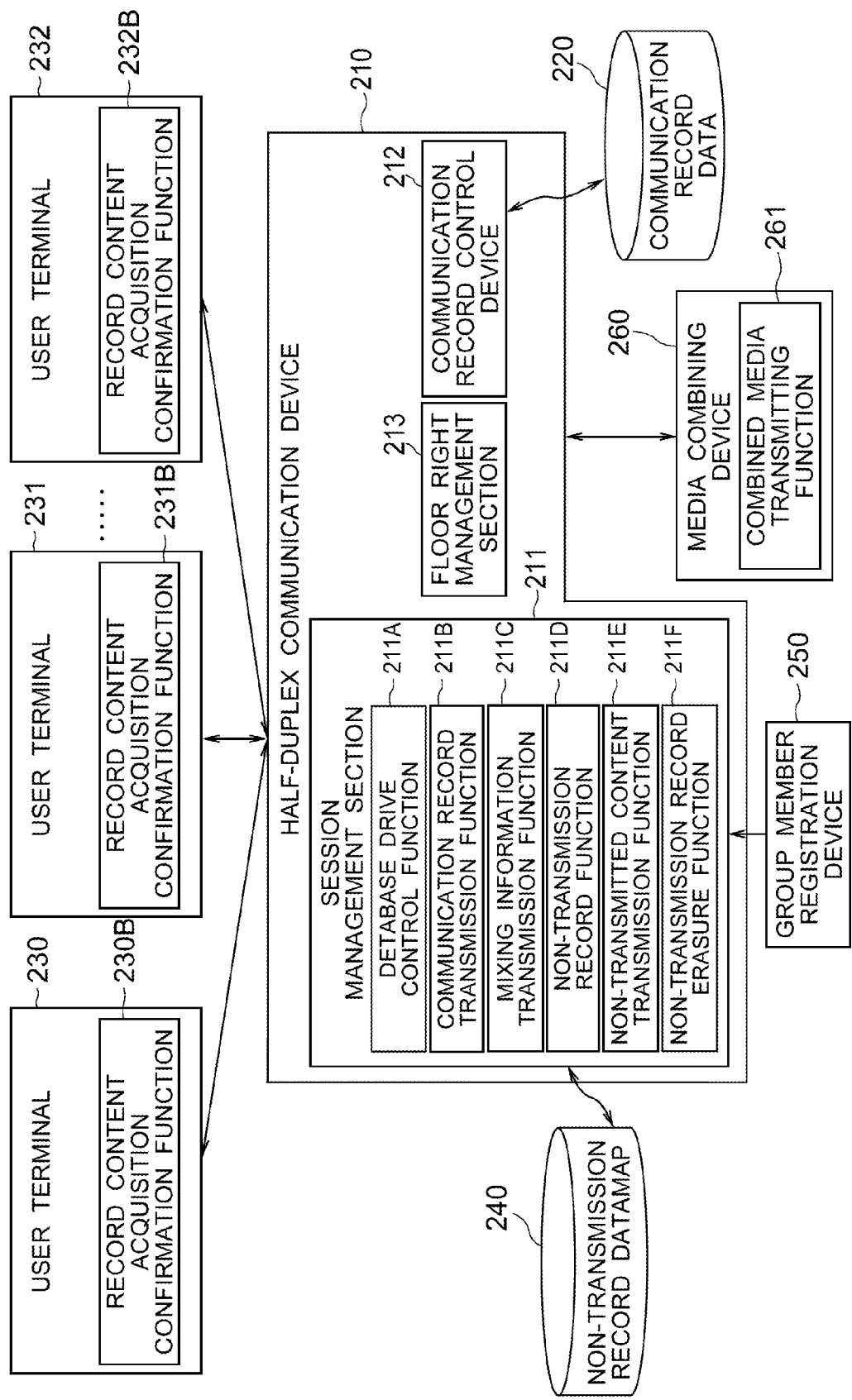
FIG. 10 is a block diagram showing a fourth exemplary embodiment of a half-duplex communication system according to the invention.
Figure 11:
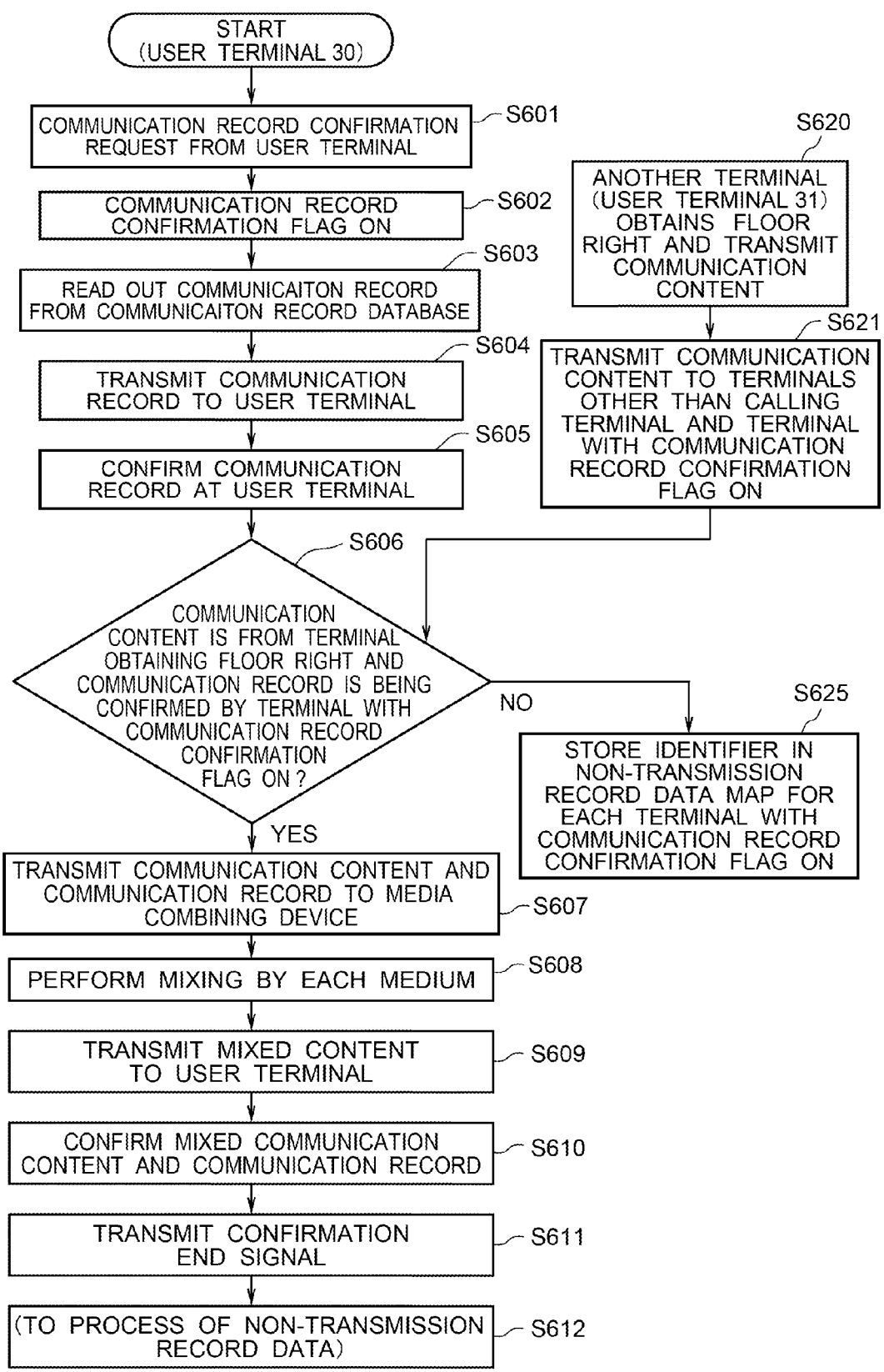
FIG. 11 is a flowchart showing the processing procedures responding to a communication record confirmation request from a user terminal in the fourth exemplary embodiment shown in FIG. 10.
Figure 12:
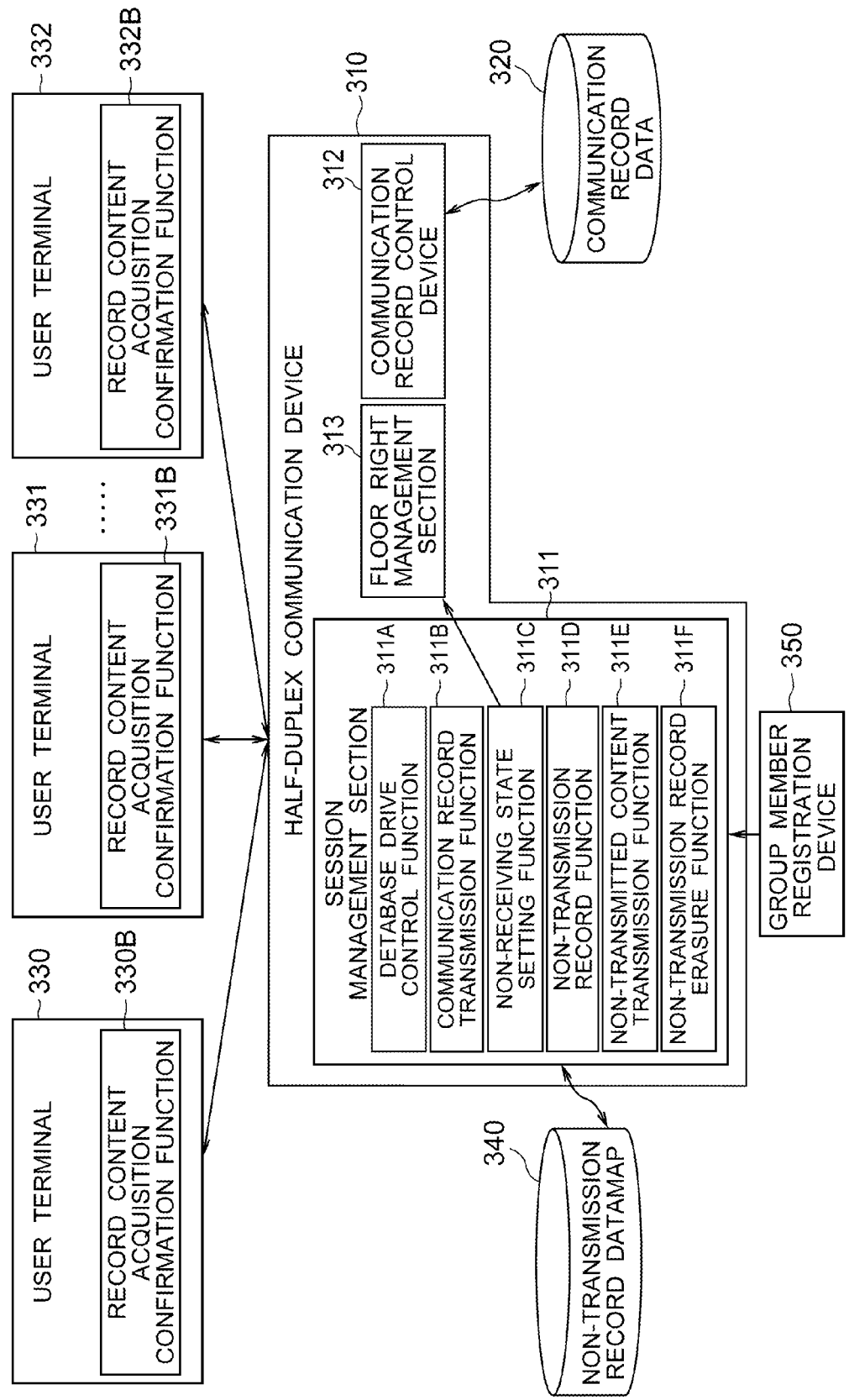
FIG. 12 is a block diagram showing a fifth exemplary embodiment of a half-duplex communication system according to the invention.
Figure 13:
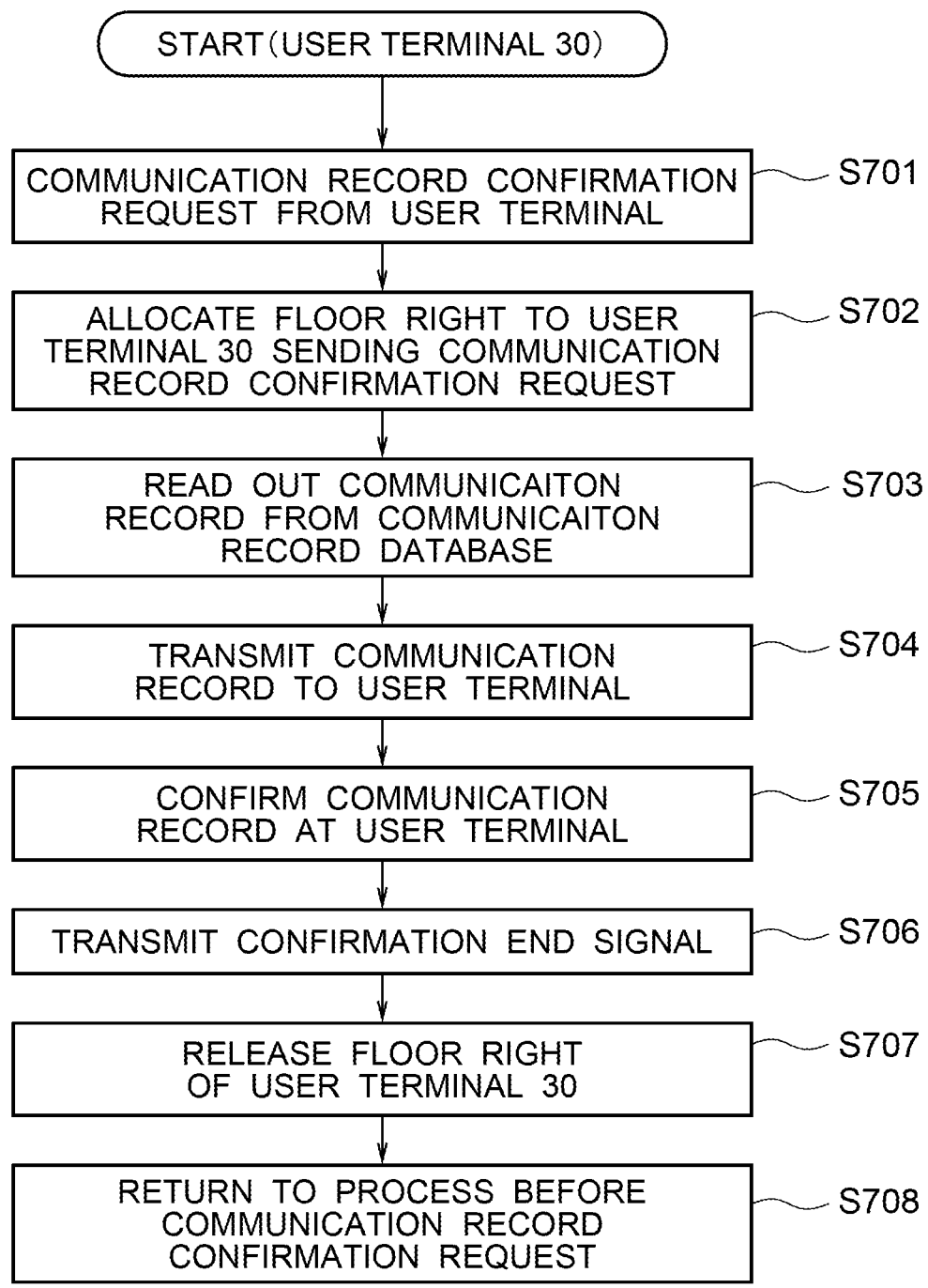
FIG. 13 is a flowchart showing the processing procedures responding to a communication record confirmation request from a user terminal in the fifth exemplary embodiment of the invention.

REFERENCE NUMERALS 10, 110, 210, 310. half-duplex communication device
20, 120, 220, 320. communication record database (communication record database)
30, 31, 32, 130, 131, 132, 230, 231, 232, 330, 331, 332. user terminal (user terminal)
40, 140, 240, 340. non-transmission record data map (non-transmission record unit)
50, 150, 250, 350. group member registration device (registration unit)
260 media combining device (media combining unit)
70, 170. communication record confirmation flag

The invention claimed is:

1. A half-duplex communication system comprising:
a plurality of user terminals; and
a half-duplex communication device which controls one-to-N communications, one of the user terminals being a calling terminal and a second user terminal being a receiving terminal, wherein the half-duplex communication device includes:
a communication record database which stores a communication content of one-to-N communications while associating the communication content with an identifier identifying a user terminal for performing one-to-N communications;
a communication record unit which writes and reads out the communication content to and from the communication record database while associating the communication content of one-to-N communications with the identifier; and
a session management section which outputs the communication content received from the calling terminal to the communication record unit while associating the communication content with an identifier of the calling terminal, causes the communication record unit to read out the communication content from the communication record database in accordance with a confirmation request received from the second user terminal, and transmits the communication content to the second user terminal sending the confirmation request,
wherein the session management section includes a unit which relays the communication content received from the calling terminal to the receiving terminal while associating the communication content with the identifier of the calling terminal;
a non-transmission record unit which, when a situation where communication contents of one-to-N communications are not transmitted to any of the plurality of user terminals occurs, records the communication content which has not been transmitted while associating the communication content with the identifier of the user terminal to which the communication content has not been transmitted in a non-transmission record data map provided beforehand;
a non-transmitted content transmission unit which, when the user terminal identified by the identifier recorded in the non-transmission record data map has completed confirmation of the communication record of one-to-N communications or when the communications have ended, reads out the communication content recorded in the non-transmission record data map, which has not been transmitted, and transmits it to the user terminal to which the communication content has not been transmitted; and
a non-transmission record erasing unit which, when the communication content which has not been transmitted is transmitted to the user terminal to which the communication content has not been transmitted, erases the transmitted communication content from the non-transmission record unit, and wherein the user terminal includes a communication record buffer which stores the communication content when the user terminal makes a call as a calling terminal, and stores the communication content relayed by the session management section while associating the communication content with the identifier of the calling terminal.

2. The half-duplex communication system as claimed in claim 1, wherein the session management section includes a unit which collectively records the communication content transmitted from the calling terminal in the communication record database and manages the communication content.

3. The half-duplex communication system as claimed in claim 1, wherein the session management section includes a unit which manages half-duplex communications performed between the user terminals using the non-transmission record data map.

4. The half-duplex communication system as claimed in claim 3, wherein the session management section includes a unit which gives a floor right to one of the user terminals when the user terminal which is the receiving terminal is confirming the communication content, and transmits a communication content transmitted from the one user terminal to another user terminal which is not the user terminal confirming the communication content.

5. The half-duplex communication system as claimed in claim 3, wherein the session management section includes a unit which gives a floor right to the user terminal confirming the communication content.

6. The half-duplex communication system as claimed in claim 1, further comprising a media combining unit which separates or combines the communication content by each medium.

7. A non-transitory computer readable recording medium storing a communication content confirmation program for performing one-to-N communications, one user terminal being a calling terminal and a second user terminal being a receiving terminal, the program causing a computer to perform:

a function of recording the communication content of one-to-N communications in a communication record database by associating the communication content with an identifier identifying a user terminal;

a function of writing and reading out the communication content to and from the communication record database while associating the communication content with the identifier;

a function of outputting the communication content from the communication record database in accordance with a confirmation request received from the second user terminal, and transmitting the communication content to the second user terminal sending the confirmation requesting; and when relaying the communication content received from the calling terminal to the receiving terminal while associating the communication content with an identifier of the calling terminal, the program further causing a computer of the user terminal to perform:

a function of, when a situation where communication contents of one-to-N communications are not transmitted to any of the plurality of user terminals occurs, records the communication content which has not been transmitted while associating the communication content with the identifier of the user terminal to which the communication content has not been transmitted in a non-transmission record data map provided beforehand;

a function of, when the user terminal identified by the identifier recorded in the non-transmission record data map has completed confirmation of the communication record of one-to-N communications or when the communications have ended, reading out the communication content recorded in the non-transmission record data map, which has not been transmitted and transmitting it to the user terminal to which the communication content has not been transmitted;

a function of, when the communication content which has not been transmitted is transmitted to the user terminal to which the communication content has not been transmitted, erasing the transmitted communication content from the non-transmission record unit; and a function of recording the communication content when the user terminal is making a call as a calling terminal in a communication record buffer, and recording the relayed communication content in the communication record buffer while associating the communication content with the identifier of the calling terminal.

8. The non-transitory computer readable recording medium storing the communication content confirmation program as claimed in claim 7, further causing the computer to perform a function of collectively recording the communication content transmitted from the calling terminal in the communication record database and managing the communication content.

9. The non-transitory computer readable recording medium storing the communication content confirmation program as claimed in claim 7, further causing the computer to perform a function of managing half-duplex communications performed between the user terminals using the non-transmission record data map.

10. The non-transitory computer readable recording medium storing the communication content confirmation program as claimed in claim 9, further causing the computer to perform a function of giving a floor right to one user terminal when the user terminal which is the receiving terminal is confirming a communication content, and a function of transmitting a communication content transmitted from the one user terminal to another user terminal which is other than the user terminal confirming the communication content.

11. The non-transitory computer readable recording medium storing the communication content confirmation program as claimed in claim 9, further causing the computer to perform a function of giving a floor right to the user terminal confirming the communication content.

12. The non-transitory computer readable recording medium storing the communication content confirmation program as claimed in claim 9, further causing the computer to perform a function of separating or combining the communication content by each medium.

13. A communication content confirmation method for performing one-to-N communications, one user terminal being a calling terminal and a second user terminal being a receiving terminal, the method comprising:

recording a communication content of one-to-N communications in a communication record database by associating the communication content with an identifier identifying a user terminal;

writing and reading out the communication content to and from the communication record database while associating the communication content with the identifier;

outputting the communication content from the communication record database in accordance with a confirmation request received from the second user terminal, and transmitting the communication content to the second user terminal sending the confirmation requesting; and when relaying the communication content received from the calling terminal to the receiving terminal while associating the communication content with an identifier of the calling terminal, storing, when a situation where communication contents of one-to-N communications are not transmitted to any of the plurality of user terminals occurs, records the communication content which has not been transmitted while associating the communication content with the identifier of the user terminal to which the communication content has not been transmitted in a non-transmission record data map provided beforehand;

reading out, when the user terminal identified by the identifier recorded in the non-transmission record data map has completed confirmation of the communication record of one-to-N communications or when the communications have ended, the communication content recorded in the non-transmission record data map, which has not been transmitted, and transmitting it to the user terminal to which the communication content has not been transmitted; and erasing, when the communication content which has not been transmitted is transmitted to the user terminal to which the communication content has not been transmitted, erases the transmitted communication content from the non-transmission record unit, and recording the communication content when the user terminal is making a call as a calling terminal in a communication record buffer, and recording the relayed communication content in the communication record buffer while associating the communication content with the identifier of the calling terminal.

14. A half-duplex communication system comprising:

a plurality of user terminals; and half-duplex communication means for controlling one-to-N communications, one of the user terminals being a calling terminal and a second user terminal being a receiving terminal, wherein the half-duplex communication device includes:

a communication record database which stores a communication content of one-to-N communications while associating the communication content with an identifier identifying a user terminal for performing one-to-N communications;

communication record means for writing and reading out the communication content to and from the communication record database while associating the communication content of one-to-N communications with the identifier; and session management means for outputting the communication content received from the calling terminal to the communication record means while associating the communication content with an identifier of the calling terminal, causing the communication record means to read out the communication content from the communication record database in accordance with a confirmation request received from the second user terminal, and transmitting the communication content to the second user terminal sending the confirmation request, wherein the session management means includes a unit which relays the communication content received from the calling terminal to the receiving terminal while associating the communication content with the identifier of the calling terminal;

a non-transmission record unit which, when a situation where communication contents of one-to-N communications are not transmitted to any of the plurality of user terminals occurs, records the communication content which has not been transmitted while associating the communication content with the identifier of the user terminal to which the communication content has not been transmitted in a non-transmission record data map provided beforehand;

a non-transmitted content transmission unit which, when the user terminal identified by the identifier recorded in the non-transmission record data map has completed confirmation of the communication record of one-to-N communications or when the communications have ended, reads out the communication content recorded in the non-transmission record data map, which has not been transmitted, and transmits it to the user terminal to which the communication content has not been transmitted; and a non-transmission record erasing unit which, when the communication content which has not been transmitted is transmitted to the user terminal to which the communication content has not been transmitted, erases the transmitted communication content from the non-transmission record unit, and wherein the user terminal includes a communication record buffer which stores the communication content when the user terminal makes a call as a calling terminal, and stores the communication content relayed by the session management means while associating the communication content with the identifier of the calling terminal.

* * * * *